US007928629B2

(12) United States Patent
Aoyama et al.

(10) Patent No.: US 7,928,629 B2
(45) Date of Patent: Apr. 19, 2011

(54) DIRECT CURRENT MOTOR

(75) Inventors: Tomohiro Aoyama, Kosai (JP); Yasuhide Ito, Hamamatsu (JP); Toshio Yamamoto, Kosai (JP)

(73) Assignee: ASMO Co., Ltd., Shizuoka-ken (JP)

( * ) Notice: Subject to any disclaimer, the term of this patent is extended or adjusted under 35 U.S.C. 154(b) by 473 days.

(21) Appl. No.: 11/875,637

(22) Filed: Oct. 19, 2007

(65) Prior Publication Data

US 2008/0093947 A1 Apr. 24, 2008

(30) Foreign Application Priority Data

Oct. 23, 2006 (JP) ................................ 2006-287724
Oct. 17, 2007 (JP) ................................ 2007-270362

(51) Int. Cl.
*H02K 13/00* (2006.01)
*H01R 39/04* (2006.01)
*H01R 39/32* (2006.01)

(52) U.S. Cl. ........ 310/248; 310/220; 310/197; 310/219; 310/252; 310/221; 310/222; 310/223; 310/224; 310/225

(58) Field of Classification Search .................. 310/197, 310/219, 220, 221, 222, 225, 245, 248, 251, 310/252

See application file for complete search history.

(56) References Cited

U.S. PATENT DOCUMENTS

| 4,437,029 | A | * | 3/1984 | Ban et al. | 310/198 |
| 4,583,016 | A | * | 4/1986 | Ban et al. | 310/198 |
| 4,876,472 | A | * | 10/1989 | Shiraki et al. | 310/198 |
| 5,202,599 | A | * | 4/1993 | Kao | 310/234 |
| 6,127,759 | A | * | 10/2000 | Tanaka et al. | 310/233 |
| 6,703,751 | B2 | * | 3/2004 | Tanaka et al. | 310/198 |
| 6,819,025 | B2 | | 11/2004 | Egawa et al. | |
| 7,239,063 | B2 | * | 7/2007 | Yamamoto et al. | 310/239 |
| 7,525,232 | B2 | * | 4/2009 | Latz et al. | 310/252 |
| 2002/0070625 | A1 | * | 6/2002 | Katoh et al. | 310/232 |
| 2004/0145268 | A1 | * | 7/2004 | Yamamoto et al. | 310/249 |
| 2005/0029894 | A1 | * | 2/2005 | Egawa et al. | 310/216 |
| 2007/0018530 | A1 | * | 1/2007 | Yamamoto et al. | 310/239 |

FOREIGN PATENT DOCUMENTS

| JP | 2003-259582 | | 9/2003 |
| JP | 2004-88915 | | 3/2004 |
| WO | WO 2005020390 | * | 3/2005 |

* cited by examiner

*Primary Examiner* — Quyen Leung
*Assistant Examiner* — Terrance Kenerly
(74) *Attorney, Agent, or Firm* — Marsh Fischmann & Breyfogle LLP

(57) ABSTRACT

A stator has four or more magnetic poles. A commutator has a plurality of segments arranged in the circumferential direction and a short-circuit conductor for short-circuiting predetermined segments from among these segments. Each segment has an angular width WS, and there is a gap of an angular width WU between the segments. A substantial angular width WB of each of an anode brush and a cathode brush satisfies $(n-1)(WS+WU)+WU<WB<n(WS+WU)+WU$, where n is an integer no less than two. A plurality of coils are each connected to the corresponding one of the segments in order to form n closed loops. The closed loops each pass through the corresponding segments and are electrically independent of each other.

15 Claims, 18 Drawing Sheets

Fig.16
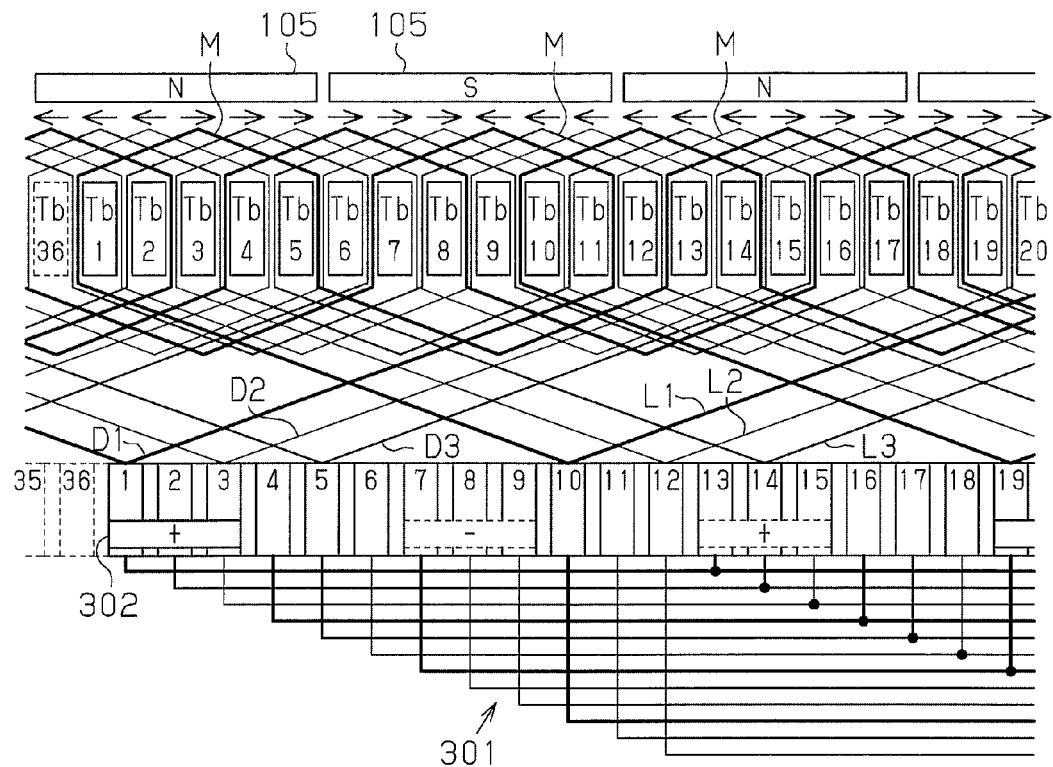
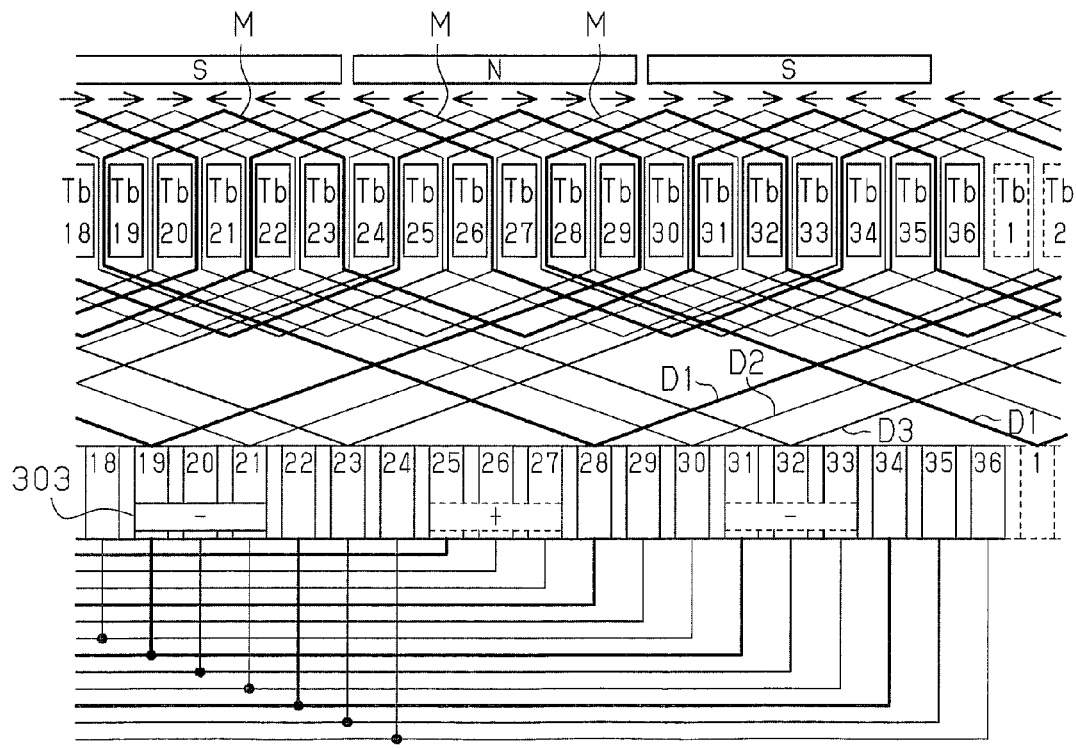

DIRECT CURRENT MOTOR

BACKGROUND OF THE INVENTION

The present invention relates to a direct current motor provided with a stator having four or more magnetic poles.

The direct current motor disclosed in Japanese Laid-Open Patent Publication 2004-88915 has a stator where magnets are placed to form four or more magnetic poles. The rotary shaft rotates integrally with an armature core and a commutator core, and the armature core has a plurality of coils. The commutator has a plurality of segments arranged in the circumferential direction, and a short-circuit conductor for short-circuiting predetermined segments to each other. The coils are each connected to corresponding segments such that one closed circuit (closed loop) including the short-circuit conductor and all of the coils is formed between an anode brush and a cathode brush which contact and slide against the segments.

In the direct current motor in the above described publication, however, the number of closed loops including the short-circuit conductor and all of the coils is one. Therefore, it is necessary for the cross-sectional area of the short-circuit conductor to be large, in order to prevent the density of the main current flowing through the short-circuit conductor from becoming too high. As a result, the space in which the short-circuit conductor is placed becomes large, making the commutator and the direct current motor large. In the case where the short-circuit conductor is short-circuit wires made of conducting wire, for example, it is necessary for the space between the commutator where short-circuit wires are placed and the armature core in the axial direction to be set large. In addition, in the case where the short-circuit conductor is a great number of short-circuit pieces formed through punching out a conductor plate, the commutator having these short-circuit pieces becomes large.

SUMMARY OF THE INVENTION

An objective of the present invention is to provide a direct current motor that reduces the size of the short-circuit conductor (reduction in the size of a space for accommodating the short-circuit conductor).

According to one aspect of the present invention, a direct current motor provided with a stator having four or more magnetic poles is provided. An armature is rotatable relative to the stator. The armature is provided with an armature core and a commutator which rotate integrally. The armature core has a plurality of teeth and a plurality of coils which are respectively wound around these teeth. The commutator has a plurality of segments arranged in a circumferential direction, and a short-circuit conductor for short-circuiting predetermined segments from among these segments. Each segment has an angular width WS, and there is a space of an angular width WU between each adjacent pair of the segments. An anode brush and a cathode brush contact and slide against the respective segments when the commutator rotates. The respective practical angular widths WB of the anode brush and the cathode brush satisfy $(n-1)(WS+WU)+WU<WB<n(WS+WU)+WU$, where n is set to be an integer no less than two. The coils are respectively connected to the corresponding segments, in order to form n closed loops which pass through the respective corresponding segments, and are electrically independent of each other.

Other aspects and advantages of the invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

FIG. 16 is a view gained by dividing a developed view showing the direct current motor according to a seventh embodiment of the present invention into top and bottom sections;

DETAILED DESCRIPTION OF THE PREFERRED EMBODIMENTS

FIGS. 1 to 9 show a first embodiment of the present invention.

Figure 1:
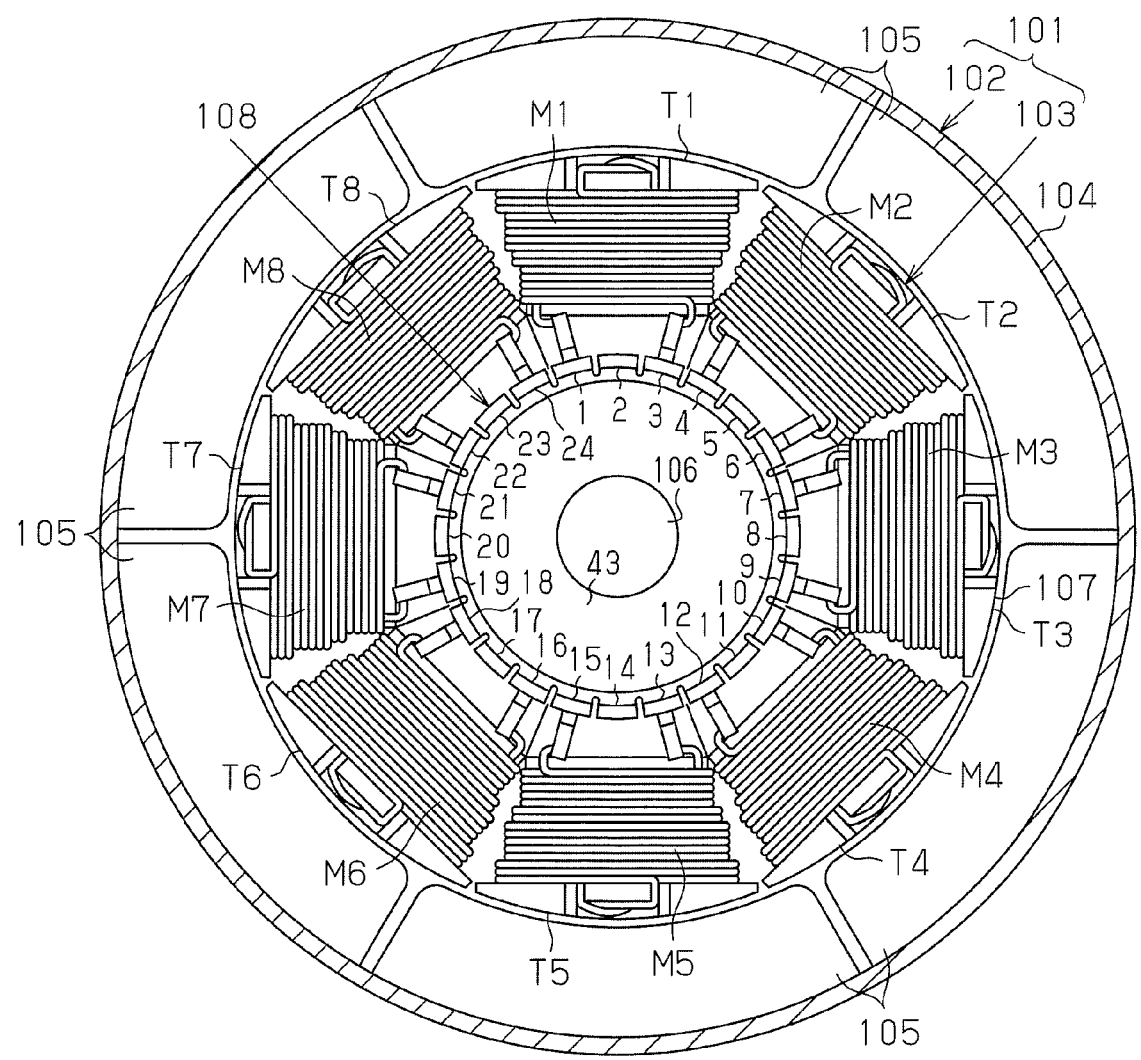
FIG. 1 is a plan view showing a direct current motor according to a first embodiment of the present invention.
Figure 2:
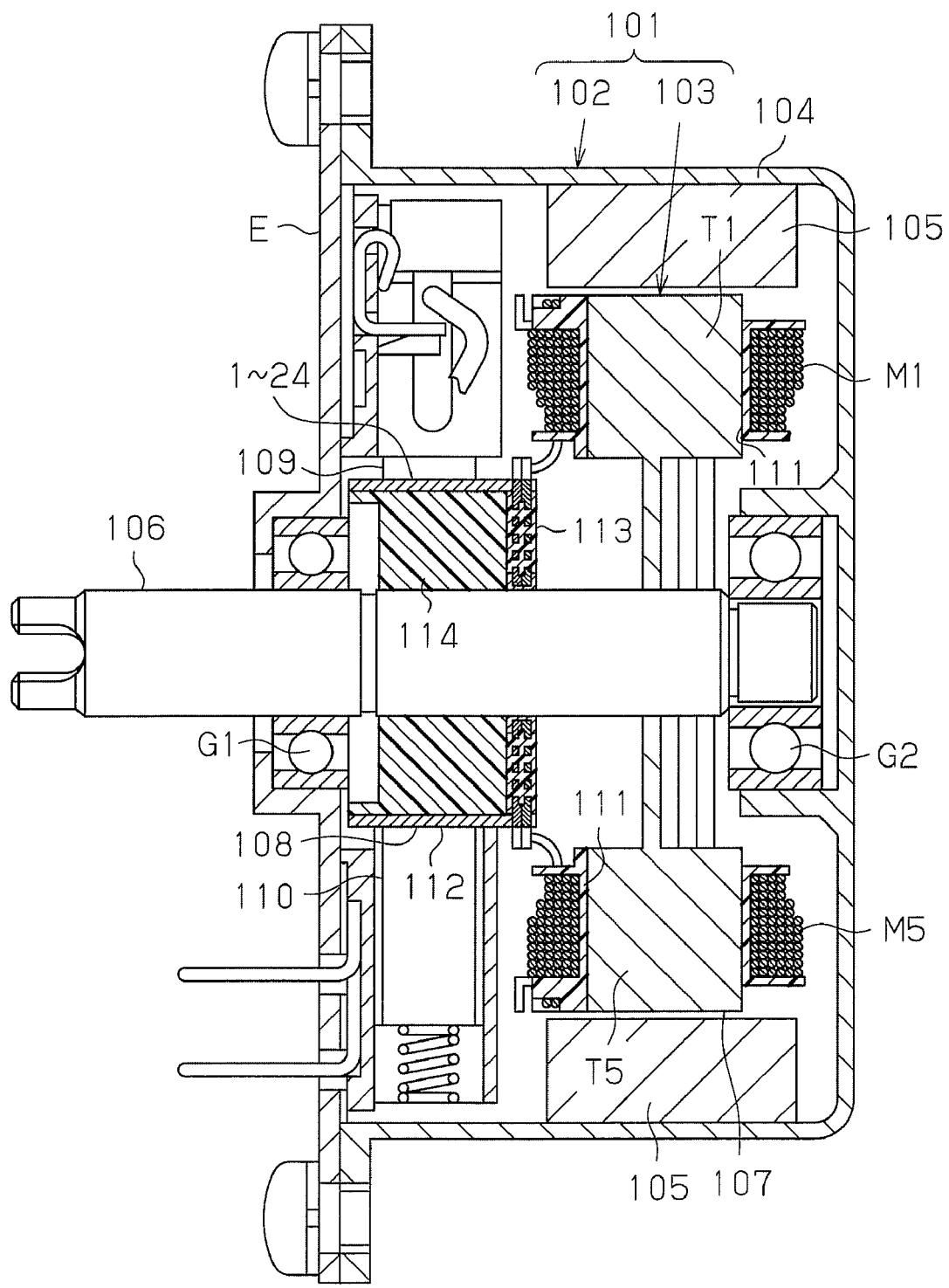
FIG. 2 is a longitudinal cross-sectional view showing the motor of FIG. 1.

FIGS. 1 and 2 show a direct current motor 101 according to the first embodiment, and the direct current motor 101 is provided with a stator 102 and an armature 103. The stator 102 is provided with a cylindrical yoke housing 104 with a bottom and an end housing E for closing the opening of the yoke housing 104, and six magnets 105 are placed on the inner circumferential surface of the yoke housing 104. These magnets 105 are placed at an equal angular interval in the circumferential direction so as to form six magnetic poles in total.

As shown in FIGS. 1 and 2, the armature 103, which is a rotor, is provided with a rotary shaft 106, and an armature core 107, and a commutator 108 which are respectively fixed to the rotary shaft 106. As shown in FIG. 2, the commutator 108 is located between the armature core 107 and the end housing E in the axial direction. The outer circumferential surface of the armature core 107 faces the magnets 105, and the armature core 107 is surrounded by a plurality of armature cores 107. A first bearing G1 held by the end housing E and a second bearing G2 held at the bottom of the yoke housing 104 support the rotary shaft 106 so that the rotary shaft 106 is rotatable relative to the stator 102. The end housing E holds an anode brush 109 and a cathode brush 110 for supplying a drive current to the commutator 108, and the anode brush 109 and the cathode brush 110 are made to contact and pressed against the outer circumferential surface of the commutator 108 by the pressing force of coil springs.

Figure 5:
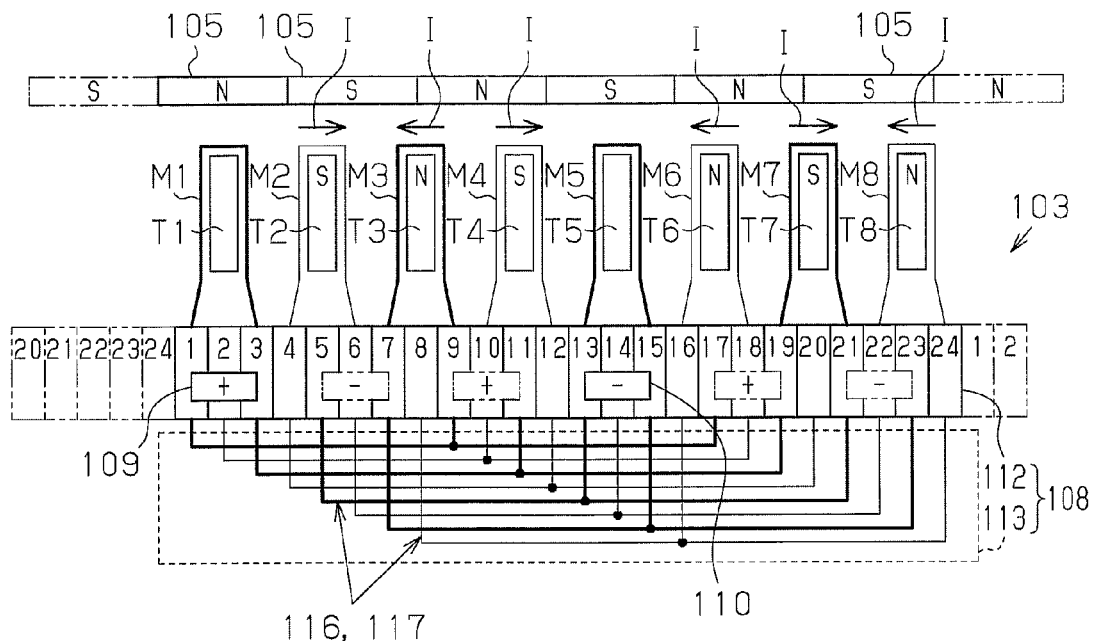
FIG. 5 is a developed view showing the motor of FIG. 1.

As shown in FIGS. 1 and 5, the armature core 107 has eight teeth T1 to T8 which extend in radiating form from the rotary shaft 106, and a total of eight coils M1 to M8 are wound around the respective corresponding teeth T1 to T8 by way of concentrated winding with insulators 111 (see FIG. 2) in between.

As shown in FIGS. 2 and 5, the commutator 108 includes a cylindrical main body 112 and a short-circuit member 113 which is attached to an end of the commutator main body 112 in the axial direction, and furthermore, the commutator main body 112 has a cylindrical main body insulating material 114 and twenty-four segments 1 to 24 which are placed around the outer circumferential surface of the main body insulating material 114. The segments 1 to 24 are arranged in the circumferential direction of the main body insulating material 114 with an interval, and as a result, the segments 1 to 24 are in cylindrical form on the outer circumferential surface of the main body insulating material 114. The anode brush 109 and the cathode brush 110 are made to contact and pressed against the outer circumferential surface of the segments 1 to 24 so as to be slidable against the outer circumferential surface of the segments 1 to 24.

Figure 6:
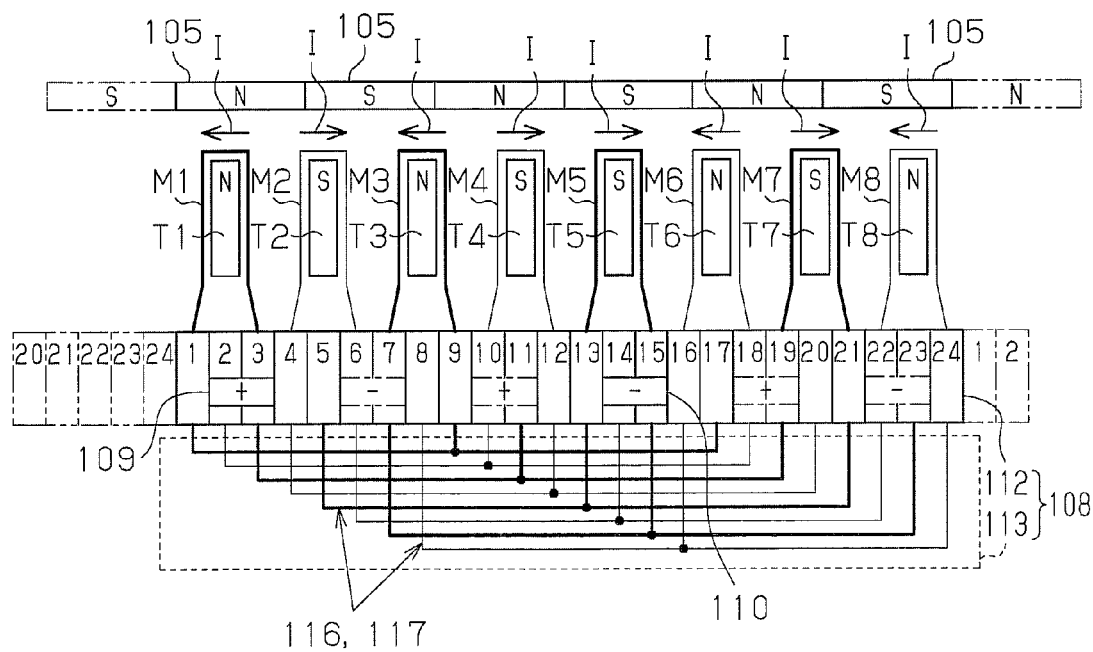
FIG. 6 is a developed view showing the state after the commutator has rotated from the state in FIG. 5.

As shown in FIGS. 5 and 6, the short-circuit member 113 electrically connects the segments 1 to 24 at an interval of 120 degrees. In other words, the short-circuit member 113 short-circuits the segments 1, 9 and 17, skipping seven segments in the circumferential direction, and short-circuits the segments 5, 13 and 21 as another group. In FIGS. 5 and 6, the arrows show a drive current I which flows through the coils M1 to M8, and "N" and "S" show the magnetic poles (N poles and S poles) generated by the drive current I so as to face each other in the magnets 105. FIG. 6 shows the state after the coils M1 to M8, the teeth T1 to T8, the segments 1 to 24 and the short-circuit member 113 in the armature 103 have moved to the left by half the size of one segment in the circumferential direction relative to the magnets 105, the anode brush 109 and the cathode brush 110 in the stator 102 from the state in FIG. 5.

In FIGS. 5 and 6, the actual anode brush 109 is shown as "+" in a solid rectangular box, and the actual cathode brush 110 is shown as "−" in a solid rectangular box. In the case of FIG. 5, the anode brush 109 contacts the segments 1 to 3, and the cathode brush 110 contacts the segments 13 to 15. Furthermore, in FIGS. 5 and 6, "+" in a two-dot chain line rectangular box is attached respectively to the segments 9 to 11 and the segments 17 to 19, which become of the same potential as the above described segments 1 to 3 when connected to these segments 1 to 3 through the short-circuit member 113, and "−" in a two-dot chain line rectangular box is attached respectively to the segments 5 to 7 and the segments 21 to 23, which become of the same potential as the above described segments 13 to 15 when connected to these segments 13 to 15 through the short-circuit member 113, "+" and "−" in these two-dot chain line rectangular boxes can be considered to be imaginary anode brush 109 and cathode brush 110, respectively. That is to say, the anode brush 109 can be considered to substantially contact the segments 9 to 11 and the segments 17 to 19, and the cathode brush 110 can be considered to substantially contact the segments 5 to 7 and the segments 21 to 23.

Figure 3:
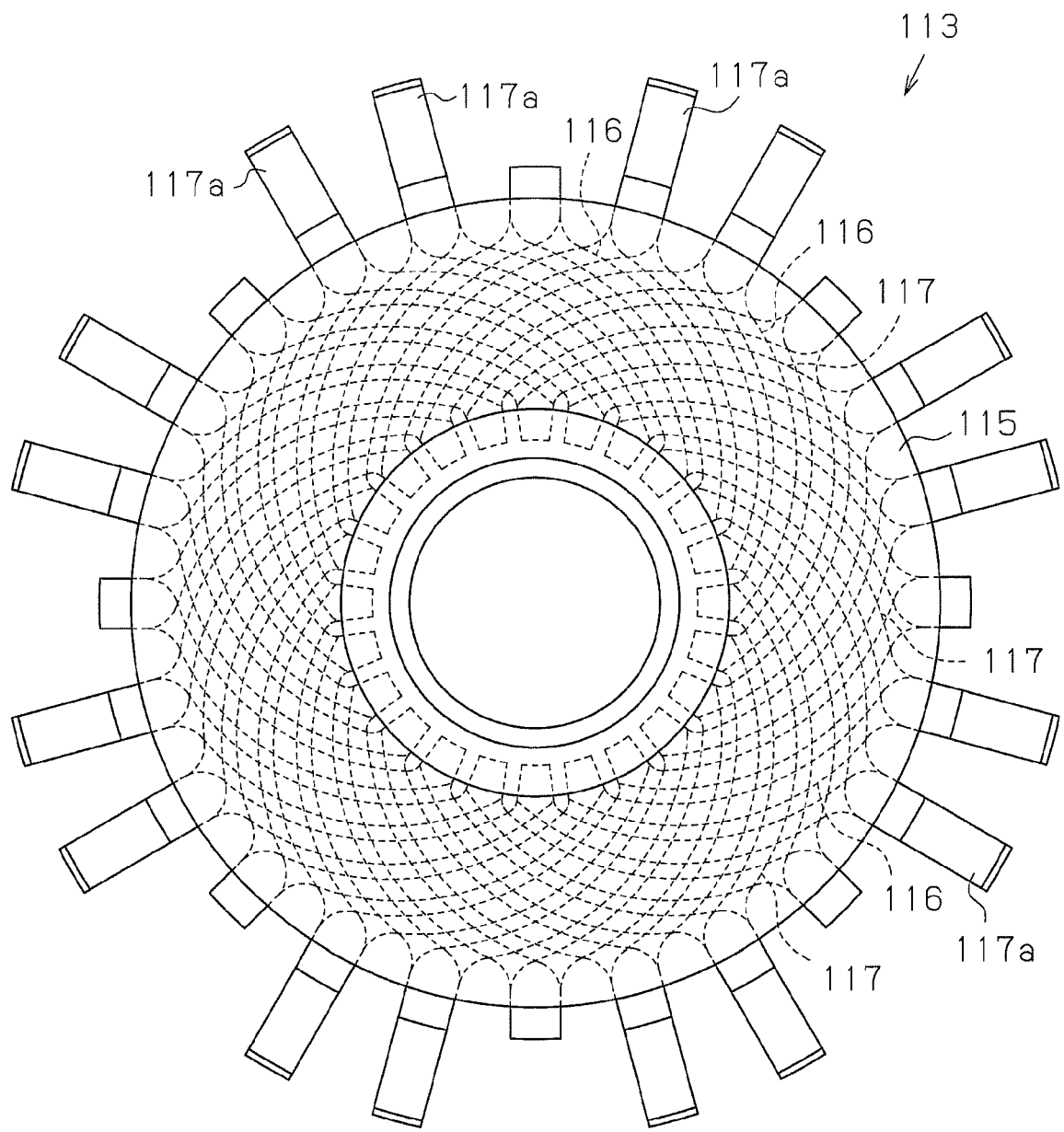
FIG. 3 is a plan view showing the short-circuit members shown in FIG. 2.
Figure 4:
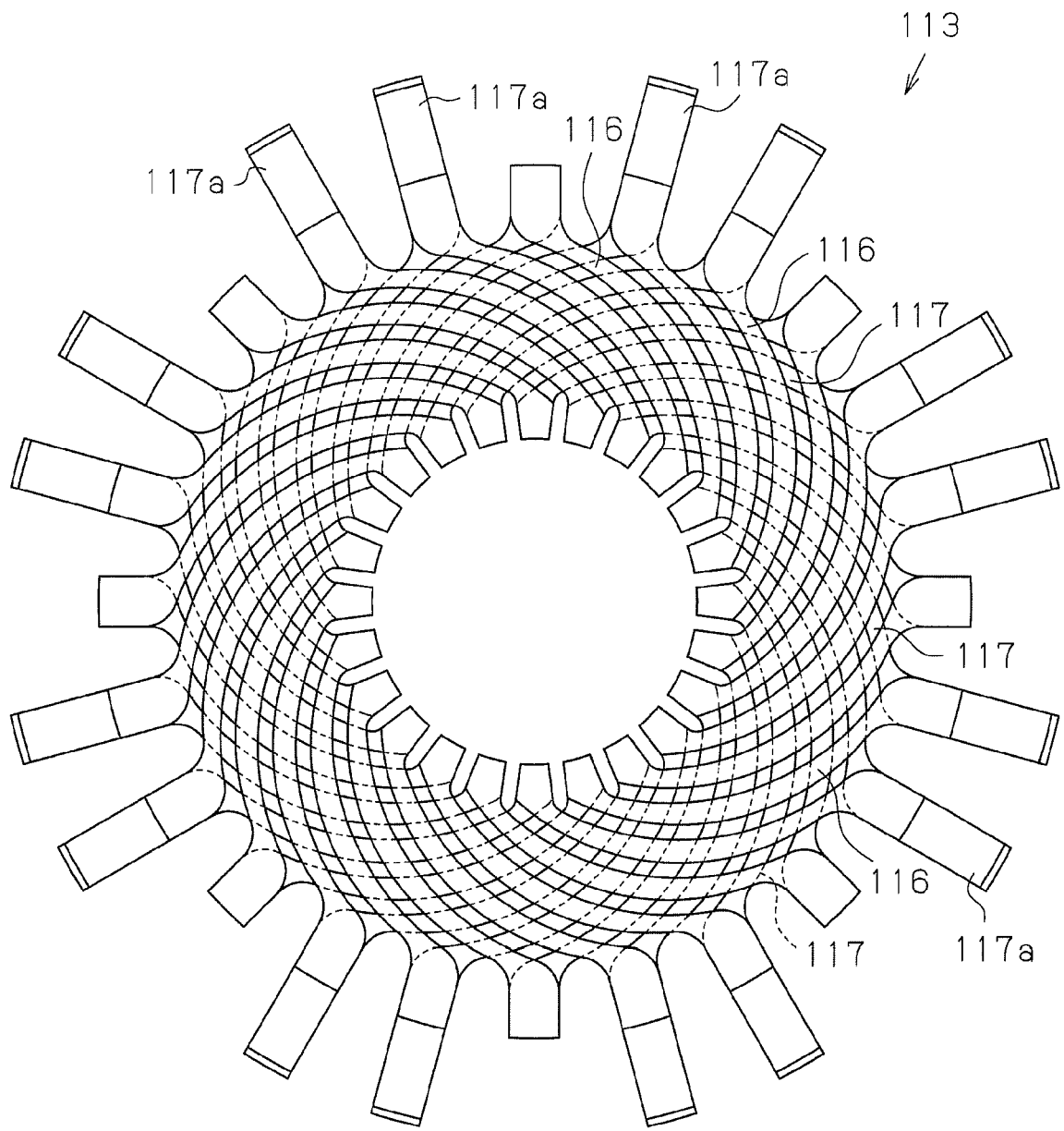
FIG. 4 is a plan view showing only the short-circuit pieces shown in FIG. 3.

As shown in FIGS. 3 and 4, the short-circuit member 113 is provided with an insulating resin 115 in disc form, and twenty-four first short-circuit pieces 116 and twenty-four second short-circuit pieces 117 which are formed and respectively inserted into the insulating resin 115. The twenty-four first short-circuit pieces 116 are arranged so as to form one disc layer, and the twenty-four second short-circuit pieces 117 are arranged so as to form another disc layer which overlaps the layer of the first short-circuit pieces 116. In FIG. 4, the insulating resin 115 is omitted in order to make it easy to see the first short-circuit pieces 116 and the second short-circuit pieces 117 which overlap in the axial direction as separate short-circuit conductors.

The twenty-four first short-circuit pieces 116 are simultaneously formed through punching out from one conductor plate, and in the same manner, the twenty-four second short-circuit pieces 117 are simultaneously formed through punching out from another conductor plate. In FIGS. 3 and 4, the first short-circuit pieces 116 are located on a side closer to the viewer of the drawing, and the second short-circuit pieces 117 are located on a side further from the viewer of the drawing. The radial inner end of each first short-circuit piece 116 is displaced from the radial outer end in a first circumferential direction (the clockwise direction in FIGS. 3 and 4) by 60°, and the radial inner end of each second short-circuit piece 117 is displaced from the radial outer end in a second circumferential direction (the counterclockwise direction in FIGS. 3 and 4) by 60°.

The radial inner end of each first short-circuit pieces 116 is electrically connected to the radial inner end of the corresponding second short-circuit piece 117, and the radial outer end of each first short-circuit piece 116 is electrically connected to the radial outer end of the corresponding second short-circuit piece 117. The insulating resin 115 is located between the radial middle portion of each first short-circuit pieces 116 and the radial middle portion of the corresponding second short-circuit piece 117, and therefore, the radial middle portion of the first short-circuit piece 116 is electrically isolated from the radial middle portion of the second short-circuit piece 117 in the axial direction. As a result, the radial outer end of each first short-circuit piece 116 is electrically connected to the radial outer end of the corresponding second short-circuit piece 117 at a distance of 120°. The short-circuit member 113 is attached to the commutator main body 112 so that the radial outer ends of the each first short-circuit piece 116 and the each second short-circuit piece 117 are electrically connected to the corresponding one of the segments 1 to 24. Risers 117a for fixing the ends of the coils M1 to M8 are formed at the radial outer ends of sixteen of the second short-circuit pieces 117. The risers 117a, sixteen in total, are arranged in such a manner that eight pairs in total are provided for the twenty-four second short-circuit pieces 117 with one second short-circuit piece 117 skipped for every pair.

Figure 7:
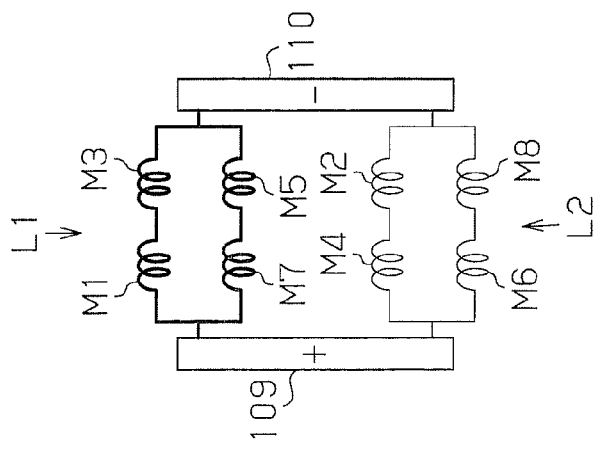
FIG. 7 is a view showing a circuit formed of a plurality of coils shown in FIG. 5.

As shown in FIG. 7, the coils M1 to M8 are each connected to the riser 117a of the corresponding one of the segments 1 to 24 so as to form n closed loops L1 and L2 which are electrically independent of each other between the anode brush 109 and the cathode brush 110. The n closed loops L1 and L2 correspond to 2n parallel lines. n is an integer no less than two, and in the present embodiment, n=2. The first closed loop L1 and the second closed loop L2 respectively pass through the corresponding segments 1 to 24, a plurality of first short-circuit pieces 116 and a plurality of second short-circuit pieces 117.

In FIGS. 5 to 7, the first closed loop L1 is shown by a thick line, and the second closed loop L2 is shown by a thin line. The first closed loop L1 includes the coils M1, M3, M5 and M7, and specific first short-circuit pieces 116 and second short-circuit pieces 117, while the second closed loop L2 includes the coils M4, M2, M8 and M6, and other specific first short-circuit pieces 116 and second short-circuit pieces 117. In FIG. 7, the coils M1, M3, M5 and M7 are arranged clockwise along the first closed loop L1 in this order, while the coils M4, M2, M8 and M6 are arranged clockwise along the second closed loop L2 in this order. The first closed loop L1 has two parallel lines, and the second closed loop L2 has two other parallel lines, between the anode brush 109 and the cathode brush 110, and thus, the direct current motor has four parallel lines in total. In the case of FIG. 7, there are first parallel lines including the coils M1 and M3, second parallel lines including the coils M7 and M5, third parallel lines including the coils M4 and M2, and fourth parallel lines including the coils M6 and M8.

As shown in FIGS. 5 and 6, the two ends of each coil M1 to M8 are connected to a pair of segments sandwiching one segment in the circumferential direction. That is to say, the two ends of the coil M1 are connected to the segments 1 and 3. In the same manner, the two ends of the coil M2 are connected to the segments 4 and 6, the two ends of the coil M3 are connected to the segments 7 and 9, and the two ends of the coil M4 are connected to the segments 10 and 12. The two ends of the coil M5 are connected to the segments 13 and 15, the two ends of the coil M6 are connected to the segments 16 and 18, the two ends of the coil M7 are connected to the segments 19 and 21, and the two ends of the coil M8 are connected to the segments 22 and 24.

For example, when the right direction is defined as the first circumferential direction in FIG. 5, and the left direction is defined as the second circumferential direction in FIG. 5, the first circumferential end (right end) of the coil M1 is connected to the segment 3 adjacent to the segment 4, to which the second circumferential end (left end) of the coil M2, which is adjacent to the coil M1 in the first circumferential direction (the right direction), is connected, in the second circumferential direction (the left direction). That is, the first circumferential end of any given coil is connected to a segment that is adjacent in the second circumferential direction to a segment to which the second circumferential end of a coil that is adjacent in the first circumferential direction to the given coil is connected.

In contrast, the second circumferential end (left end) of the coil M1 is connected to the segment 1 adjacent to the segment 24, to which the first circumferential end (right end) of the coil M8, which is adjacent to the coil M1 in the second circumferential direction (the left direction), is connected, in the circumferential first direction (the right direction). That is, the second circumferential end of any given coil is connected to a segment that is adjacent in the first circumferential direction to a segment to which the first circumferential end of a coil that is adjacent in the second circumferential direction to the given coil is connected.

As described above, the coils M1, M3, M5 and M7, as well as the coils M4, M2, M8 and M6, which, respectively, correspond to the first closed loop L1 and the second closed loop L2, which are different from each other, are cyclically connected to the segments 1 to 24 which are adjacent in the circumferential direction. The segments 1, 3, 7, 9, 13, 15, 19 and 21, which correspond to the first closed loop L1, and the segments 4, 6, 10, 12, 16, 18, 22 and 24, which correspond to the second closed loop L2, are alternately arranged.

Figure 8A:
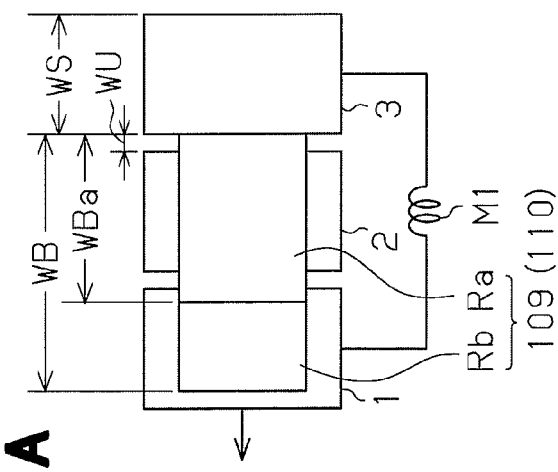
FIGS. 8A and 8B are front views showing the anode brush and three segments shown in FIG. 2.

As shown in FIG. 8A, the angular width of each segment 1 to 24 is referred to as WS, and the angular width of the space between each circumferentially adjacent pair of segments 1 to 24 is referred to as WU. WU<WS is satisfied. The angular width of the anode brush 109 is the same as the angular width of the cathode brush 110, and these are referred to as WB. WB is set so as to satisfy condition formula (n−1)(WS+WU)+WU<WB<n(WS+WU)+WU. When the left side of the condition formula (n−1)(WS+WU)+WU<WB is satisfied, a current can be always supplied to all of n closed loops L1 and L2. When the right side of the condition formula WB<n(WS+WU)+WU of the condition formula is satisfied, the direction of the current through the closed loops L1 and L2 can be prevented from being disturbed. According to the present embodiment, n=2 and (WS+WU)+WU<WB<2(WS+WU)+WU, and therefore, the angular width of the anode brush 109 and the cathode brush 110 is set as WB=2WS+WU.

Figure 8B:
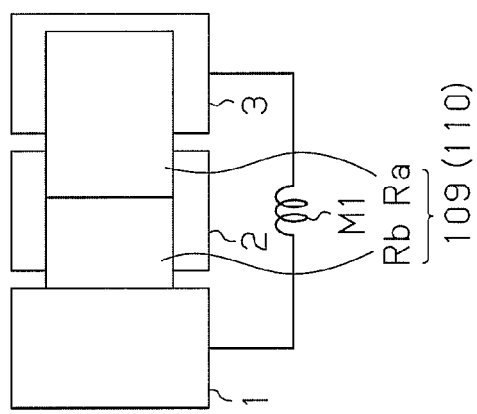

As shown in FIGS. 8A and 8B, the anode brush 109 and the cathode brush 110 both include a low resistance portion Ra and a high resistance portion Rb, and the resistance value of the high resistance portion Rb is lower than the resistance value of the low resistance portion Ra. The resistivity of the material for the high resistance portion Rb, for example, is higher than the resistivity of the material for the low resistance portion Ra. The low resistance portion Ra is located on the leading side of the armature 103 relative to the rotational direction, while the high resistance portion Rb is located on the trailing side relative to the rotation direction, and therefore, the high resistance portion Rb is later than the low resistance portion Ra in separating from the respective segments 1 to 24 when the direct current motor rotates. The anode brush 109 and the cathode brush 110 are both multilayer brushes where the low resistance portion Ra is layered on and integrated with the high resistance portion Rb. The angular width WBa of the low resistance portion Ra is set so as to satisfy (n−1)(WS+WU)+WU<WBa. When (n−1) (WS+WU)+WU<WBa is satisfied, the low resistance portion Ra can always supply a current to all of n closed loops L1 and L2. According to the present embodiment, n=2 and the angular width WBa is set slightly greater than WS+2WU. The angular width WBa of the low resistance portion Ra is set slightly greater than half of WB, that is to say, the angular width of the high resistance portion Rb is set smaller than the angular width of the low resistance portion Ra. When the armature 103 rotates, the segments 1 to 3 move from right to left in FIG. 8A relative to the anode brush 109, and thus, the state of FIG. 8B is gained. The high resistance portion Rb, which contacts the segment 1 in FIG. 8A, is separated from the segment 1 in FIG. 8B, while a sufficiently large area of the low resistance portion Ra, which does not contact the segment 3 yet in FIG. 8A, contacts the segment 3. Throughout the processes in FIGS. 8A and 8B, the anode brush 109 keeps making contact with the segment 2.

When a drive current is supplied to the coils M1 to M8 from the anode brush 109 and the cathode brush 110 via a commutator 108, torque is simultaneously generated by the coils M1 to M8 in locations corresponding to the respective magnets 105, and thus, the armature 103 rotates.

The first embodiment has the following advantages.

(1) The coils M1 to M8 and the segments 1 to 24 form two closed loops L1 and L2 which are electrically independent of each other, and therefore, the number of paths for the main current of the direct current motor 101 is two times, that is to say, n times greater than in the case where, for example, the coils together form one closed loop. Therefore, according to the present embodiment, the cross-sectional area of the current path in the first short-circuit pieces 116 and the second short-circuit pieces 117 can respectively be made ½, that is to say, 1/n. As a result, the first short-circuit pieces 116 and the second short-circuit pieces 117 can be reduced in size, and the space for placing the short-circuit members 113 can be made smaller, and thus, the commutator 108 and the direct current motor 101 can be miniaturized. The material cost for the first short-circuit pieces 116 and the second short-circuit pieces 117 can be reduced.

(2) The anode brush 109 and the cathode brush 110 both have a low resistance portion Ra and a high resistance portion Rb which is on the trailing side of the low resistance portion Ra relative to the direction in which the commutator 108 rotates. Accordingly, the portion of the anode brush 109 which contacts each segment 1 to 24 to the end when the commutator 108 rotates is the high resistance portion Rb, and the portion of the cathode brush 110 which contacts each segment 1 to 24 to the end is also the high resistance portion Rb. Accordingly, the sparks generated by the anode brush 109 and the cathode brush 110 are reduced. The amount of wear of the anode brush 109 and the cathode brush 110 is reduced, and thus, a long life is provided.

Figure 9A:
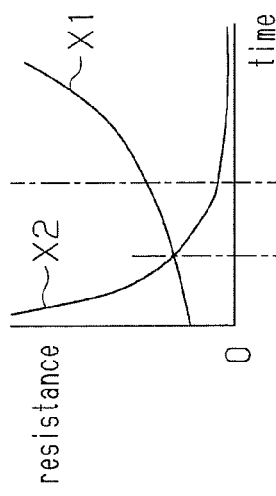
FIG. 9A is a graph showing the time-resistance plot between a coil M1 and the anode brush in FIG. 8A.

FIG. 9A is a graph showing the time-resistance plot from the state in FIG. 8A to the state in FIG. 8B, where the first resistance characteristic line X1 is the resistance value between the anode brush 109 and the segment 1, and the second resistance characteristic line X2 are the resistance value between the anode brush 109 and the segment 3. The first resistance characteristic line X1 is shown as a curve of inverse proportions which drops from the upper left to the lower right in FIG. 9A, while the second resistance characteristic line X2 is shown as a curve which is concave upward and rises from the lower left to the upper right.

Figure 9B:
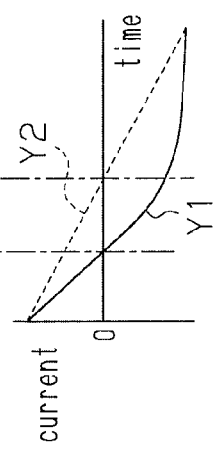
FIG. 9B is a graph showing the time-current plot of the coil M1 in FIG. 8A.

FIG. 9B is a graph showing the time-current plot at the time of commutation corresponding to FIG. 9A, where the commutation curve Y1 shows commutation characteristic line corresponding to the first resistance characteristic line X1 and the second resistance characteristic line X2, and straight broken line commutation Y2 shows the commutation characteristic line of brushes having a uniform resistance distribution, and there is no difference between the low resistance portion Ra and the high resistance portion Rb as a comparison example. The lateral line (time) in FIG. 9A corresponds to the lateral line (time) in FIG. 9B. At the time which corresponds to the intersection of the first resistance characteristic line X1 and the second resistance characteristic line X2 in FIG. 9A, the commutation current reaches zero along the commutation curve Y1, as shown in FIG. 9B. The time when the commutation curve Y1 reaches zero is before the time when the linear commutation Y2 reaches zero, and therefore, the current changes faster in the commutation curve Y1 than in the linear commutation Y2. Change in the current over time is gradual in the right half of FIG. 9B, that is to say, the latter half of the commutation, along the commutation curve Y1, and therefore, the anode brush 109 and the cathode brush 110 according to the present embodiment can reduce generation of sparks.

(3) The anode brush 109 and the cathode brush 110 are both multilayer brushes including a low resistance portion Ra and a high resistance portion Rb, which are formed integrally. Therefore, according to the present embodiment, the number of parts is reduced in comparison with brushes where the low resistance portion, for example, is formed separately from the high resistance portion.

(4) The angular width WBa of the low resistance portion Ra is set slightly greater than WS+2WU(WBa>WS+2WU). Therefore, the low resistance portion Ra simultaneously contacts segments 1 to 24 in each of the two closed loops L1 and L2. Accordingly, such problems that the current fails to be supplied simultaneously to the two closed loops L1 and L2, and thus, the performance of the direct current motor 101 lowers, are prevented.

Figure 10:
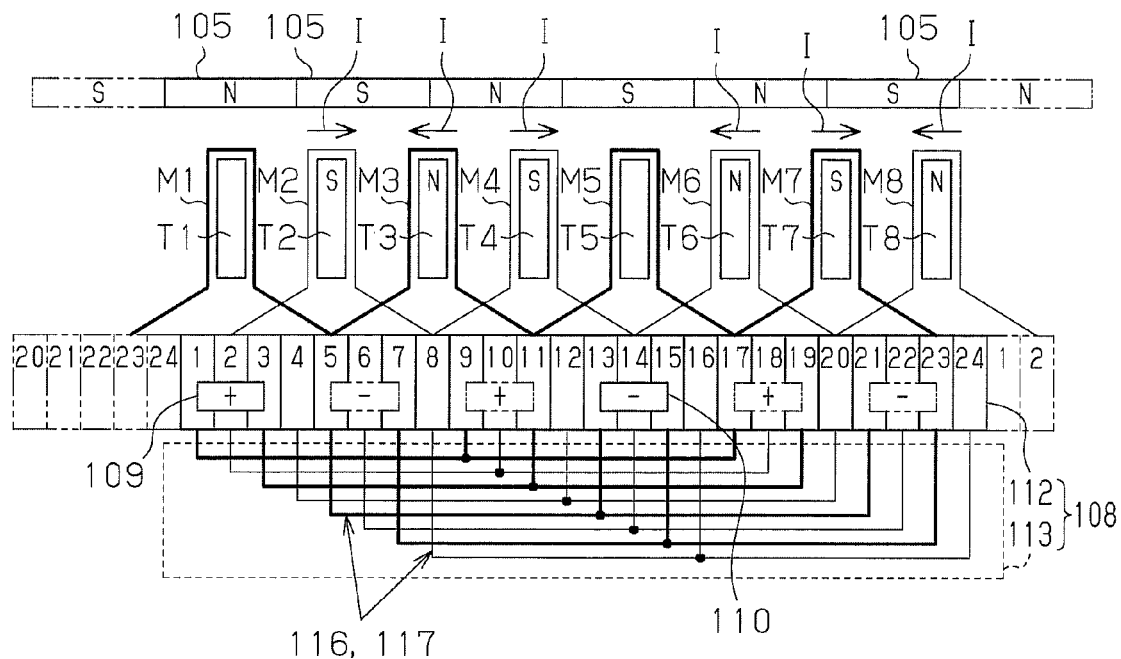
FIG. 10 is a developed view showing a direct current motor according to a second embodiment of the present invention.
Figure 11:
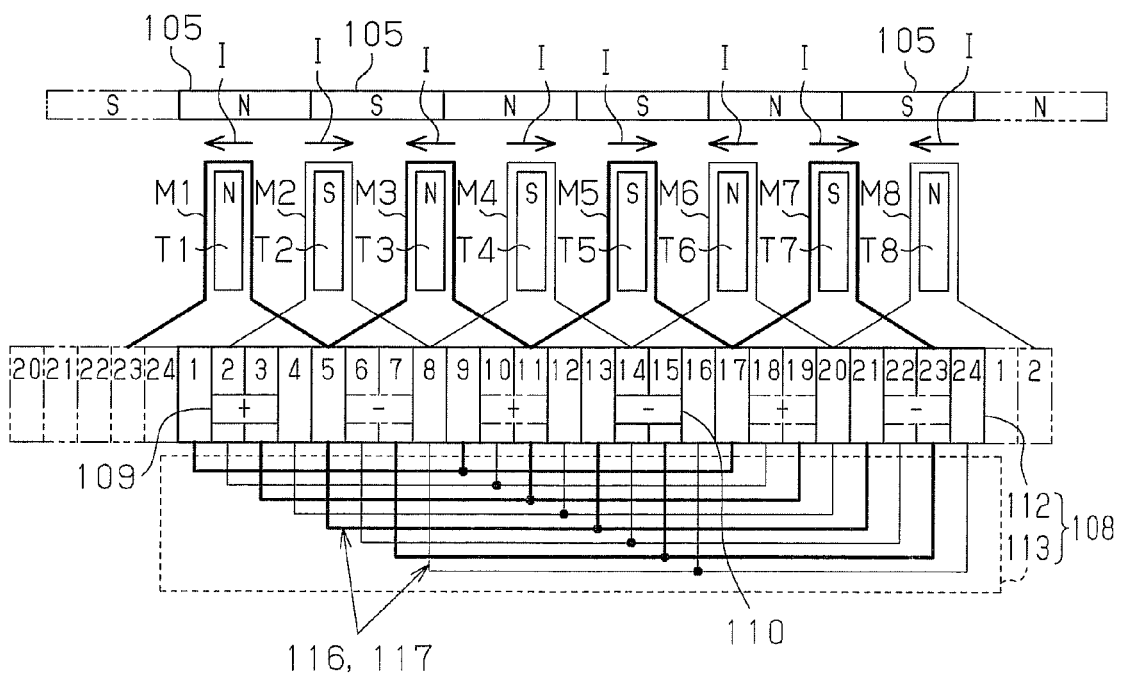
FIG. 11 is a view showing operation of the direct current motor of FIG. 10.

FIGS. 10 and 11 are developed views showing the direct current motor according to a second embodiment of the present invention. Like or the same reference numerals are given to those components that are like or the same as the corresponding components of the above embodiment and detailed explanations are omitted.

As shown in FIG. 10, the two ends of the coil M1 in the second embodiment are connected to the segments 23 and 5, skipping five segments in the circumferential direction. The coils M2 to M8 are each connected to two of the segments 1 to 24, skipping five segments. That is to say, the two ends of the coil M2 are connected to the segments 2 and 8, the two ends of the coil M3 are connected to the segments 5 and 11, and the two ends of the coil M4 are connected to the segments 8 and 14. In the same manner, the two ends of the coil M5 are connected to the segments 11 and 17, the two ends of the coil M6 are connected to the segments 14 and 20, the two ends of the coil M7 are connected to the segments 17 and 23, and the two ends of the coil M8 are connected to the segments 20 and 2.

As shown in FIG. 10, the coils M1, M3, M5 and M7 form a first closed loop L1 shown by a thick line, and the coils M2, M4, M6 and M8 form a second closed loop L2 shown by a thin line. The first circumferential end (right end in FIG. 10)

of the coil M1 is connected to the segment 5, skipping two segments in the circumferential direction from the respective segments 2 and 8, to which the two ends of coil M2 adjacent to the coil M1 in the first circumferential direction (the right direction), are connected. In the same manner, the second circumferential end (left end) of the coil M1 is connected to the segment 23, skipping two segments in the circumferential direction from the respective segments 20 and 2, to which the two ends of the coil M8 adjacent to the coil M1 in the second circumferential direction (the left direction), are connected. The same relationships hold between the other coils M3 to M7, in addition to the coils M1, M2 and M8. That is to say, the segments 5, 11, 17 and 23 corresponding to the first closed loop L1 and the segments 2, 8, 14 and 20 corresponding to the second closed loop L2 are alternately arranged.

Accordingly, two closed loops L1 and L2 are formed in the same manner as in the direct current motor 101 according to the first embodiment, and therefore, the second embodiment in FIG. 10 has the same advantages.

The first and second embodiments shown in FIGS. 1 to 11 have coils M1 to M8 that are wound by way of concentrated winding, while the direct current motors according to the third to seventh embodiments shown in FIGS. 12 to 16 have a plurality of coils M that are wound by way of distributed winding.

Figure 12:
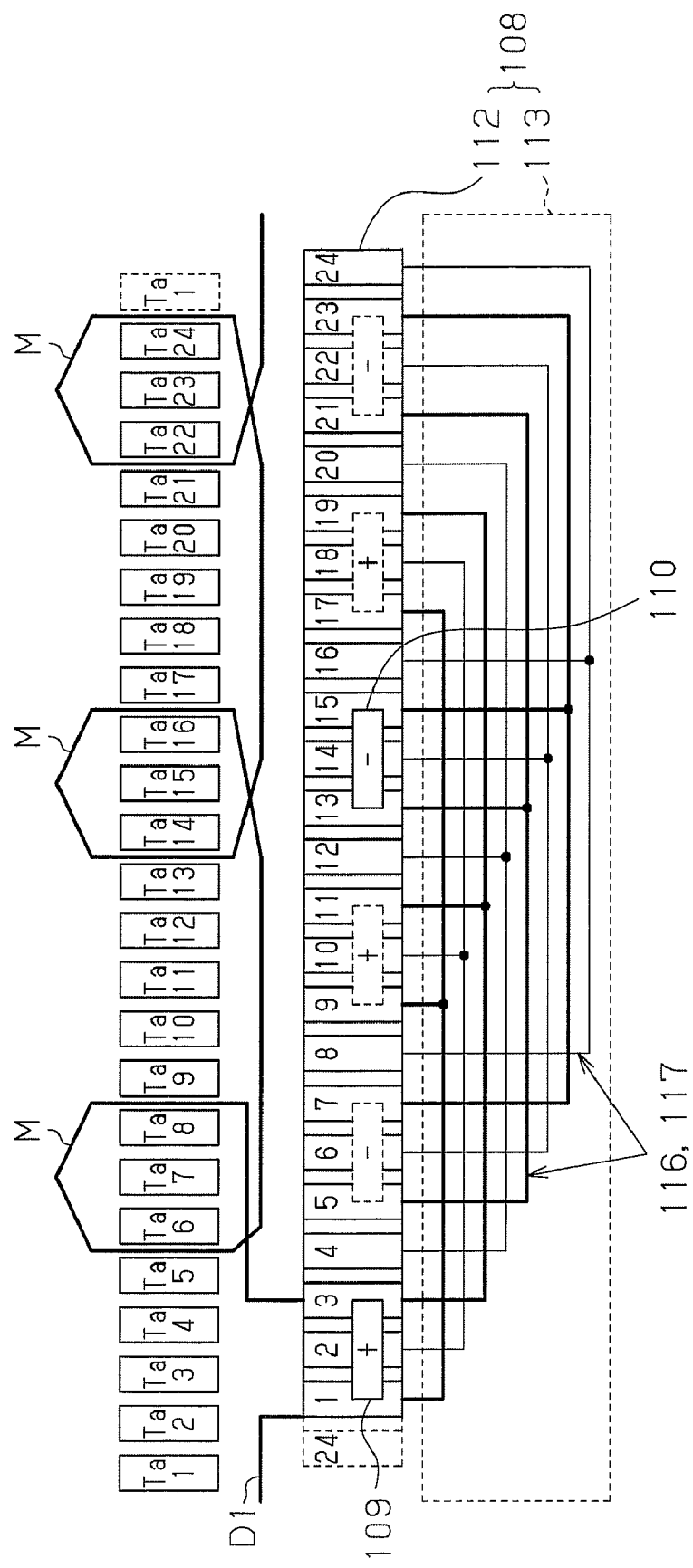
FIG. 12 is a developed view showing a direct current motor according to a third embodiment of the present invention.

FIG. 12 is a developed view showing a direct current motor according to the third embodiment of the present invention.

As shown in FIG. 12, the armature core according to the third embodiment has twenty-four teeth Ta1 to Ta24, and first to eighth conducting wires D1 to D8 are wound around these teeth Ta1 to Ta24 by way of distributed winding so that a plurality of coils M are formed. FIG. 12 only shows the first conducting wire D1, so as not to make the figure complicated, and the second conducting wire D2 to the eighth conducting wire D8 are not shown, and thus, FIG. 12 shows only a portion of the coils M.

As shown in FIG. 12, the first end of the first conducting wire D1 is connected to the segment 1, and the second end of the first conducting wire D1 is connected to the segment 3. The first conducting wire D1 is wound around the teeth Ta22, Ta23 and Ta24 by way of distributed winding, from the segment 1, wound around teeth Ta14, Ta15 and Ta16 by way of distributed winding, and then wound around teeth Ta6, Ta7 and Ta8 by way of distributed winding, and thus, the respective coils M are formed and extend toward the segment 3.

That is to say, the two ends of the first conducting wire D1 are connected to the initial segment 1 and the last segment 3 from among the three consecutive segments 1 to 3. The first conducting wire D1 is wound around the three consecutive teeth Ta22, Ta23 and Ta24 from the initial segment 1, and then, skips the five teeth Ta17, Ta18, Ta19, Ta20 and Ta21, is wound around the three consecutive teeth Ta14, Ta15 and Ta16, and furthermore, skips the five teeth Ta9, Ta10, Ta11, Ta12 and Ta13, is wound around the three consecutive teeth Ta6, Ta7 and Ta8, and then, is connected to the last segment 3.

The first to eighth conducting wires D1 to D8 are cyclically arranged in the same manner for every three segments. That is to say, the first end of the second conducting wire D2 (not shown in FIG. 12) is connected to the segment 4, and the second end of the second conducting wire D2 is connected to the segment 6. The second conducting wire D2 is wound around the teeth Ta1, Ta2 and Ta3 by way of distributed winding from the segment 4, wound around the teeth Ta17, Ta18 and Ta19, and then, the teeth Ta9, Ta10 and Ta11 by way of distributed winding, and thus, forms the respective coils M, and then, extends towards the segment 6. The first end of the third conducting wire D3 is connected to the segment 7, and the second end of the third conducting wire D3 is connected to the segment 9. The third conducting wire D3 is wound around the teeth Ta4, Ta5 and Ta6 by way of distributed winding from the segment 7, wound around the teeth Ta20, Ta21 and Ta22, and then, the teeth Ta12, Ta13 and Ta14 by way of distributed winding, and thus, forms the respective coils M, and then, extends toward the segment 9. The first end of the fourth conducting wire D4 is connected to the segment 10, and the second end of the fourth conducting wire D4 is connected to the segment 12. The fourth conducting wire D4 is wound around the teeth Ta7, Ta8 and Ta9 by way of distributed winding from the segment 10, wound around the teeth Ta23, Ta24 and Ta1, and then, the teeth Ta15, Ta16 and Ta17 by way of distributed winding, and thus, forms the respective coils M, and then, extends toward the segment 12.

In the same manner, the first end of the fifth conducting wire D5 is connected to the segment 13, and the second end of the fifth conducting wire D5 is connected to the segment 15. The fifth conducting wire D5 is wound around the teeth Ta10, Ta11 and Ta12 by way of distributed winding from the segment 13, wound around the teeth Ta2, Ta3 and Ta4, and then, the teeth Ta18, Ta19 and Ta20 by way of distributed winding, and thus, forms the respective coils M, and then, extends toward the segment 15. The first end of the sixth conducting wire D6 is connected to the segment 16, and the second end of the sixth conducting wire D6 is connected to the segment 18. The sixth conducting wire D6 is wound around the teeth Ta13, Ta14 and Ta15 by way of distributed winding from the segment 16, wound around the teeth Ta5, Ta6 and Ta7, and then the teeth Ta21, Ta22 and Ta23 by way of distributed winding, and thus, forms the coils M, and then, extends toward the segment 18.

In the same manner, the first end of the seventh conducting wire D7 is connected to the segment 19, and the second end of the seventh conducting wire D7 is connected to the segment 21. The seventh conducting wire D7 is wound around the teeth Ta16, Tael7 and Ta18 by way of distributed winding from the segment 19, wound around the teeth Ta8, Ta9 and Ta10, and then the teeth Ta24, Ta1 and Ta2 by way of distributed winding, and thus, forms the respective coils M, and then, extends toward the segment 21. The first end of the eighth conducting wire D8 is connected to the segment 22 and the second end of the eighth conducting wire D8 is connected to the segment 24. The eighth conducting wire D8 is wound around the teeth Ta19, Ta20 and Ta21 by way of distributed winding from the segment 22, wound around the teeth Ta11, Ta12 and Ta13, and then, the teeth Ta3, Ta4 and Ta5 by way of distributed winding, and thus, forms the respective coils M, and then, extends toward the segment 24.

The first conducting wire D1 having the two ends connected to the segments 1 and 3, and all of the coils M formed of the first conducting wire D1 correspond to the coil M1 according to the first embodiment shown in FIG. 5. Likewise, the second conducting wire D2 which is connected to the segments 4 and 6, and all of the coils M formed of the second wire correspond to the coil M2, and the third conducting wire D3 which is connected to the segments 7 and 9, and all of the coils M formed of the third wire correspond to the coil M3. The fourth conducting wire D4 which is connected to the segments 10 and 12, and all of the coils M formed of the fourth wire correspond to the coil M4, the fifth conducting wire D5 which is connected to the segments 13 and 15, and all of the coils M formed of the fifth wire correspond to the coil M5, the conducting wire D6 which is connected to the segments 16 and 18, and all of the coils M formed of the sixth wire correspond to the coil M6, the seventh conducting wire D7 which is connected to the segments 19 and 21, and all of the coils M formed of the seventh conducting wire D7 correspond to the coil M7, and the eighth conducting wire D8 which is connected to the segments 22 and 24, and all of the coils M formed of the eighth wire correspond to the coil M8.

Accordingly, the third embodiment in FIG. 12 has n (n=2) closed loops L1 and L2 which are electrically independent of each other, that is to say, four parallel lines, as does the first embodiment, and the coils M1, M3, M5 and M7, which correspond to the first closed loop L1, and the coils M4, M2, M8 and M6, which correspond to the second closed loop L2, are cyclically connected to the segments 1 to 24, which are adjacent in the circumferential direction.

Figure 13:
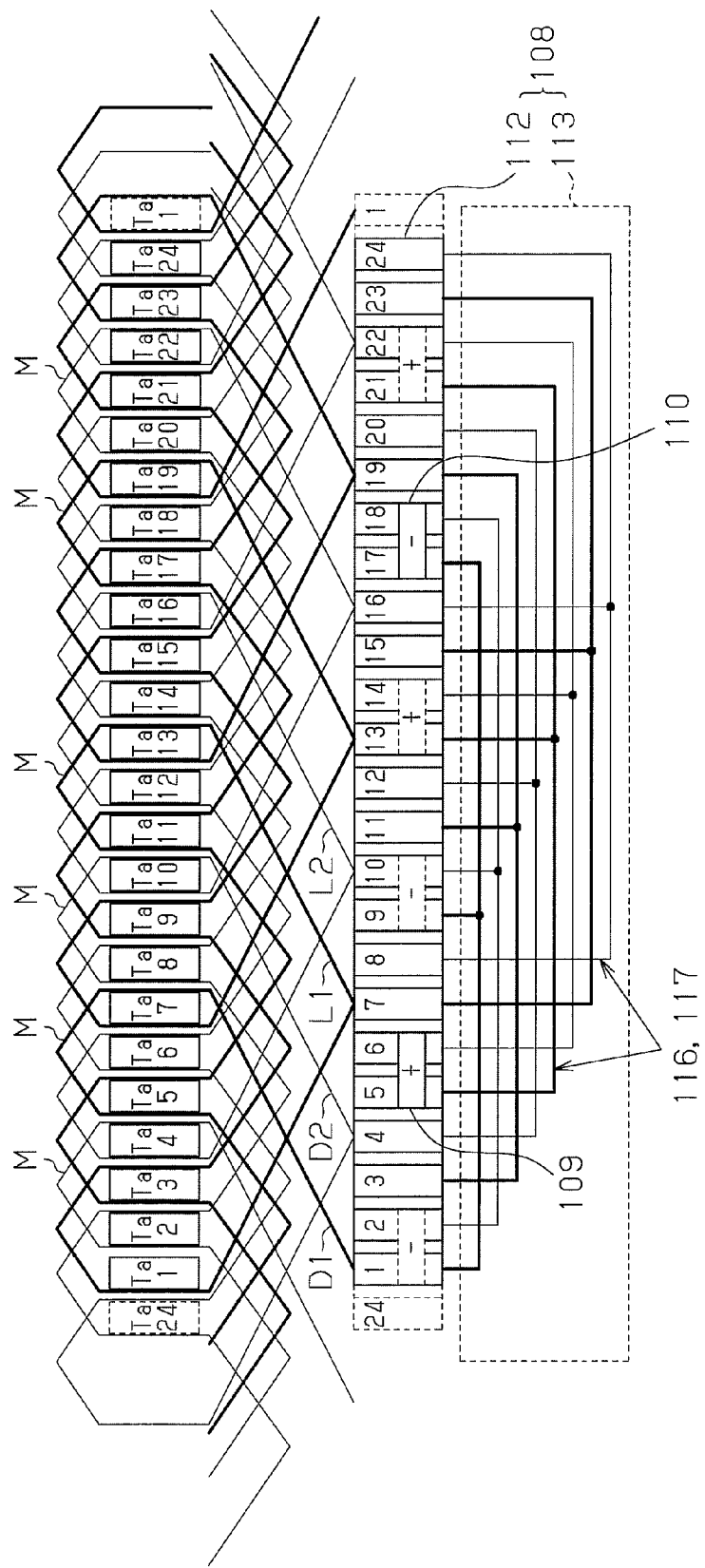
FIG. 13 is a developed view showing a direct current motor according to a fourth embodiment of the present invention.

FIG. 13 is a developed view showing the direct current motor according to the fourth embodiment of the present invention.

As shown in FIG. 13, the fourth embodiment has a first conducting wire D1 shown by a thick line and a second conducting wire D2 shown by a thin line. The first end and the second end of the first conducting wire D1 are both connected to the segment 1. That is to say, the first conducting wire D1 is tied to the first segment 1 from among the three consecutive segments 1 to 3. The first conducting wire D1 is wound around the teeth Ta19, Ta20 and Ta21 by way of distributed winding from the segment 1, wound around the teeth Ta3, Ta4 and Ta5, and then the teeth Ta11, Ta12 and Ta13 by way of distributed winding, and thus, forms the respective coils M, and then, is tied to the segment 7 so as to be connected to the segment 7. Furthermore, the first conducting wire D1 is wound around the teeth Ta1, Ta2 and Ta3 by way of distributed winding from the segment 7, wound around the teeth Ta9, Ta10 and Ta11, and then, the teeth Ta17, Ta18 and Ta19 by way of distributed winding, and tied and connected to the segment 13.

Furthermore, the first conducting wire D1 is wound around the teeth Ta7, Ta8 and Ta9 by way of distributed winding from the segment 13, wound around the teeth Ta15, Ta16 and Ta17, and then the teeth Ta23, Ta24 and Ta1 by way of distributed winding, and then tied and connected to the segment 19. Furthermore, the first conducting wire D1 is wound around the teeth Ta13, Ta14 and Ta15 by way of distributed winding from the segment 19, wound around the teeth Ta21, Ta22 and Ta23, and then, the teeth Ta5, Ta6 and Ta7 by way of distributed winding, and thus, forms the respective coils M, and then extends again toward the segment 1. In this manner, the first conducting wire D1 forms a first closed loop.

That is to say, the first conducting wire D1 which is tied to one segment from among the three consecutive segments 1 to 3, is wound around these three teeth Ta19, Ta20 and Ta21 in such a manner as to extend over the three teeth ta19, Ta20 and Ta21, and then, skips the five teeth Ta22, Ta23, Ta24, Ta1 and Ta2, and is wound around the three consecutive teeth Ta3, Ta4, and Ta5 in such a manner as to extend over these three teeth Ta3, Ta4 and Ta5, and furthermore, skips the five teeth Ta6, Ta7, Ta8, Ta9 and Ta10, is wound around the three consecutive teeth Ta11, Ta12 and Ta13 in such a manner as to extend over these three teeth Ta11, Ta12 and Ta13, and thus, is connected to the segment 7 which is the sixth segment from the segment 1 to which the first wire is first tied. The first conducting wire D1 is wound around the three remaining segments 13, 19 and 1 in the same manner, and then, returns to the segment 1 to which the first wire is first tied. That is to say, the first conducting wire D1 is tied to four segments in total; 1, 7, 13 and 19, and thus, forms the first closed loop L1.

In the same manner, the first end and the second end of the second conducting wire D2 shown by a thin line in FIG. 13 are both connected to the segment 4. The second conducting wire D2 is wound around the teeth Ta22, Ta23 and Ta24 by way of distributed winding from the segment 4, wound around the teeth Ta6, Ta7 and Ta8, and then the teeth Ta14, Ta15 and Ta16 by way of distributed winding, and thus, forms the respective coils M, and then, is tied and connected to the segment 10. Furthermore, the second conducting wire D2 is wound around the teeth Ta4, Ta5 and Ta6 by way of distributed winding from the segment 10, wound around the teeth Ta12, Ta13 and Ta14, and then the teeth Ta20, Ta21 and Ta22 by way of distributed winding, and then, is tied and connected to the segment 16. Furthermore, the second conducting wire D2 is wound around the teeth Ta10, Ta11 and Ta12 by way of distributed winding from the segment 16, wound around the teeth Ta18, Ta19 and Ta20, and then the teeth Ta2, Ta3 and Ta4 by way of distributed winding, and then tied and connected to the segment 22. Furthermore, the second conducting wire D2 is wound around the teeth Ta16, Ta17 and Ta18 by way of distributed winding from the segment 22, wound around the teeth Ta24, Ta1 and Ta2, and then the teeth Ta8, Ta9 and Ta10 by way of distributed winding, and thus, forms the respective coils M, and then, extends again toward the segment 4. In this manner, the second conducting wire D2 forms a second closed loop L2.

Therefore, the segments 1, 7, 13 and 19, which correspond to the first closed loop L1, and the segments 4, 10, 16 and 22, which correspond to the second closed loop L2, are alternately arranged in the circumferential direction. Thus, the fourth embodiment in FIG. 13 forms two closed loops L1 and L2 in wave form which respectively extend over three teeth. The number of conducting wires D1 and D2 according to the fourth embodiment is two, that is to say, the total number of all end portions of the first conducting wire D1 and the second conducting wire D2 is four, and therefore, the process for connecting wires is easy.

Figure 14:
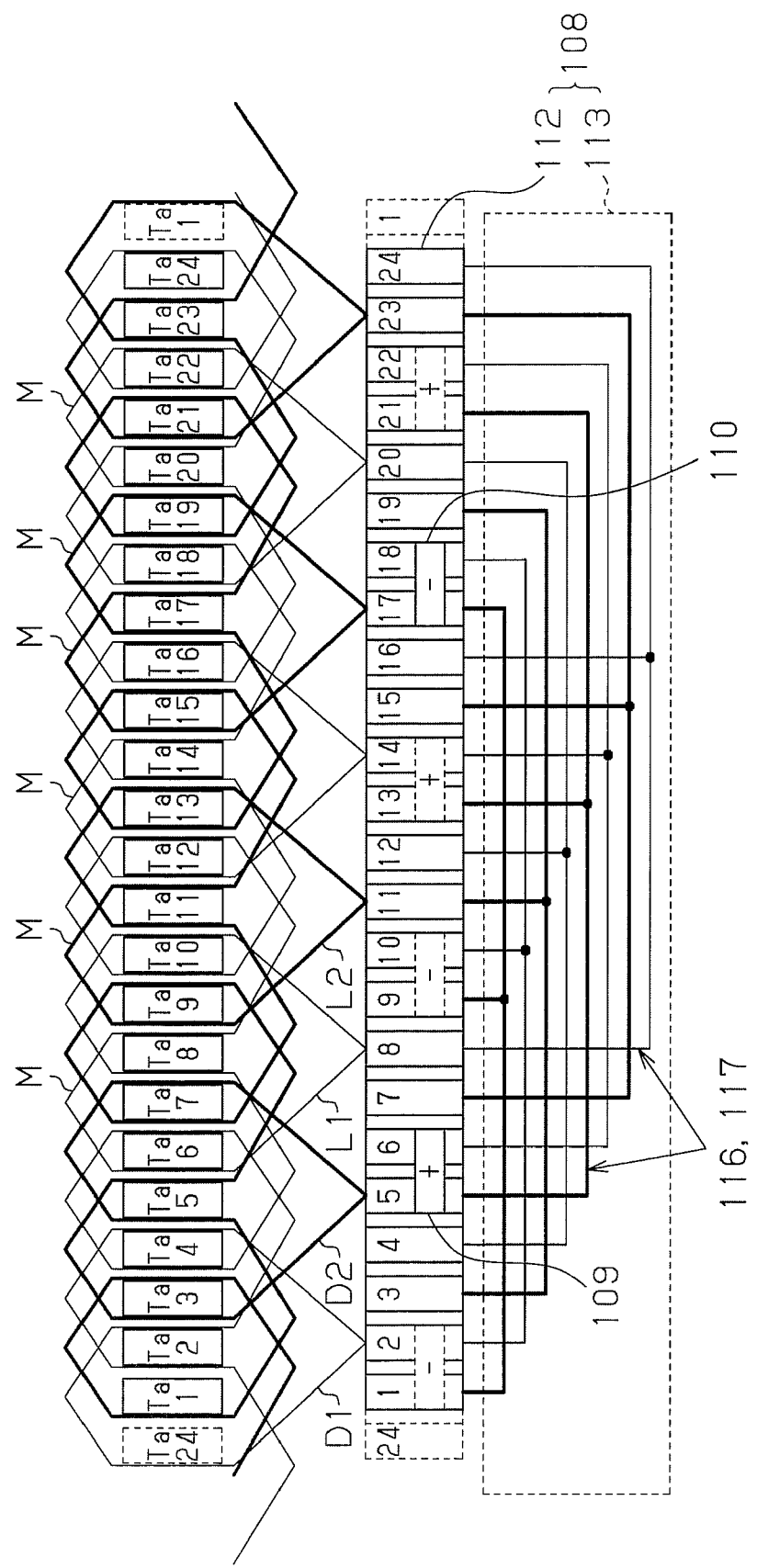
FIG. 14 is a developed view showing a direct current motor according to a fifth embodiment of the present invention.

FIG. 14 is a developed view showing the direct current motor according to the fifth embodiment of the present invention.

As shown in FIG. 14, the fifth embodiment has a first conducting wire D1 and a second conducting wire D2, and the first conducting wire D1 is shown by a thin line and the second conducting wire D2 is shown by a thick line. The first end and the second end of the first conducting wire D1 are both connected to the segment 2. That is to say, the first conducting wire D1 is tied to the second segment 2 from among the three consecutive segments 1 to 3. The first conducting wire D1 is wound around the teeth Ta24, Ta1 and Ta2 by way of distributed winding from the segment 2, wound around the teeth Ta6, Ta5 and Ta4, and then, the teeth Ta8, Ta9 and Ta10 by way of distributed winding, and thus, forms the respective coils M, and then, is tied and connected to the segment 8. Furthermore, the first conducting wire D1 is wound around the teeth Ta6, Ta7 and Ta8 from the segment 2, wound around the teeth Ta12, Ta11 and Ta10, and then the teeth Ta14, Ta15 and Ta16 by way of distributed winding, and then, is tied and connected to the segment 14. Furthermore, the first conducting wire D1 is wound around the teeth Ta12, Ta13 and Ta14 by way of distributed winding from the segment 14, wound around the teeth Ta18, Ta17 and Ta16, and then, the teeth Ta20, Ta21 and Ta22 by way of distributed winding, and then is tied and connected to the segment 20. Furthermore, the first conducting wire D1 is wound around the teeth Ta18, Ta19 and Ta20 by way of distributed winding from the segment 20, wound around the teeth Ta24, Ta23 and Ta22, and then the teeth Ta2, Ta3 and Ta4 by way of distributed winding, and thus, forms the respective coils M, and then, extends again toward the segment 2. In this manner, the first conducting wire D1 forms a first closed loop L1.

That is to say, the first conducting wire D1, which is tied to one segment 2 from among the three consecutive segments 1 to 3, is wound around the three teeth Ta24, Ta1 and Ta2 in such a manner as to extend over these three teeth Ta24, Ta1 and Ta2, and then, skips one tooth Ta3 and is wound around the three consecutive teeth Ta4, Ta5 and Ta6, and furthermore, skips one tooth Ta7 and is wound around the three consecutive teeth Ta8, Ta9 and Ta10 in such a manner as to extend over these three teeth Ta8, Ta9 and Ta10, and then, connected to the segment 8, which is the sixth segment from the segment 2 to which the first wire is first tied. The first conducting wire D1 is wound around the three remaining segments 14, 20 and 2 in the same manner, and then returns to the segment 2 to which the first wire is initially tied, and thus, is tied to four segments in total; 2, 8, 14 and 20. As a result, the first conducting wire D1 forms a first closed loop L1.

As shown in FIG. 14, the second conducting wire D2 shown by a thick line forms a second closed loop L2 in the same manner. That is to say, the first end and the second end of the second conducting wire D2 are both connected to the segment 5. The second conducting wire D2 is wound around the consecutive teeth Ta3, Ta4 and Ta5 by way of distributed winding from the segment 5, wound around the teeth Ta9, Ta8 and Ta7, and then the teeth Ta11, Ta12 and Ta13 by way of distributed winding, and then, is tied and connected to the segment 11. Furthermore, the second conducting wire D2 is wound around the teeth Ta9, Ta10 and Ta11 by way of distributed winding from the segment 11, wound around the teeth Ta15, Ta14 and Ta13, and then the teeth Ta17, Ta18 and Ta19 by way of distributed winding, and then, is tied and connected to the segment 17. Furthermore, the second conducting wire D2 is wound around the teeth Ta15, Ta16 and Ta17 by way of distributed winding from the segment 17, wound around the teeth Ta21, Ta20 and Ta19, and then the teeth Ta23, Ta24 and Ta1 by way of distributed winding, and then, is tied and connected to the segment 23. Furthermore, the second conducting wire D2 is wound around the teeth Ta21, Ta22 and Ta23 by way of distributed winding from the segment 23, wound around the teeth Ta3, Ta2 and Ta1, and then the teeth Ta5, Ta6 and Ta7 by way of distributed winding, and thus, forms the respective coils M, and then, extends again toward the segment 5. In this manner, the second conducting wire D2 forms a second closed loop L2.

Therefore, the segments 2, 8, 14 and 20, which correspond to the first closed loop L1, and the segments 5, 11, 17 and 23, which correspond to the second closed loop L2, are alternately arranged. Thus, the fifth embodiment in FIG. 14 has two closed loops L1 and L2, and therefore, the number of wires is two and the total number of end portions of the wires is four, and thus, the process for connecting wires is easy. Furthermore, the first conducting wire D1 and the second conducting wire D2 form a wave when respectively extending over three teeth, or a circle when wound around three other teeth, and thus, the length of the wires for connection can be made shorter than in the fourth embodiment in FIG. 13. The respective wires for connection are the portions of the first conducting wire D1 and the second conducting wire D2 which extend from the coils M to other coils M or segments 1 to 24.

Figure 15:
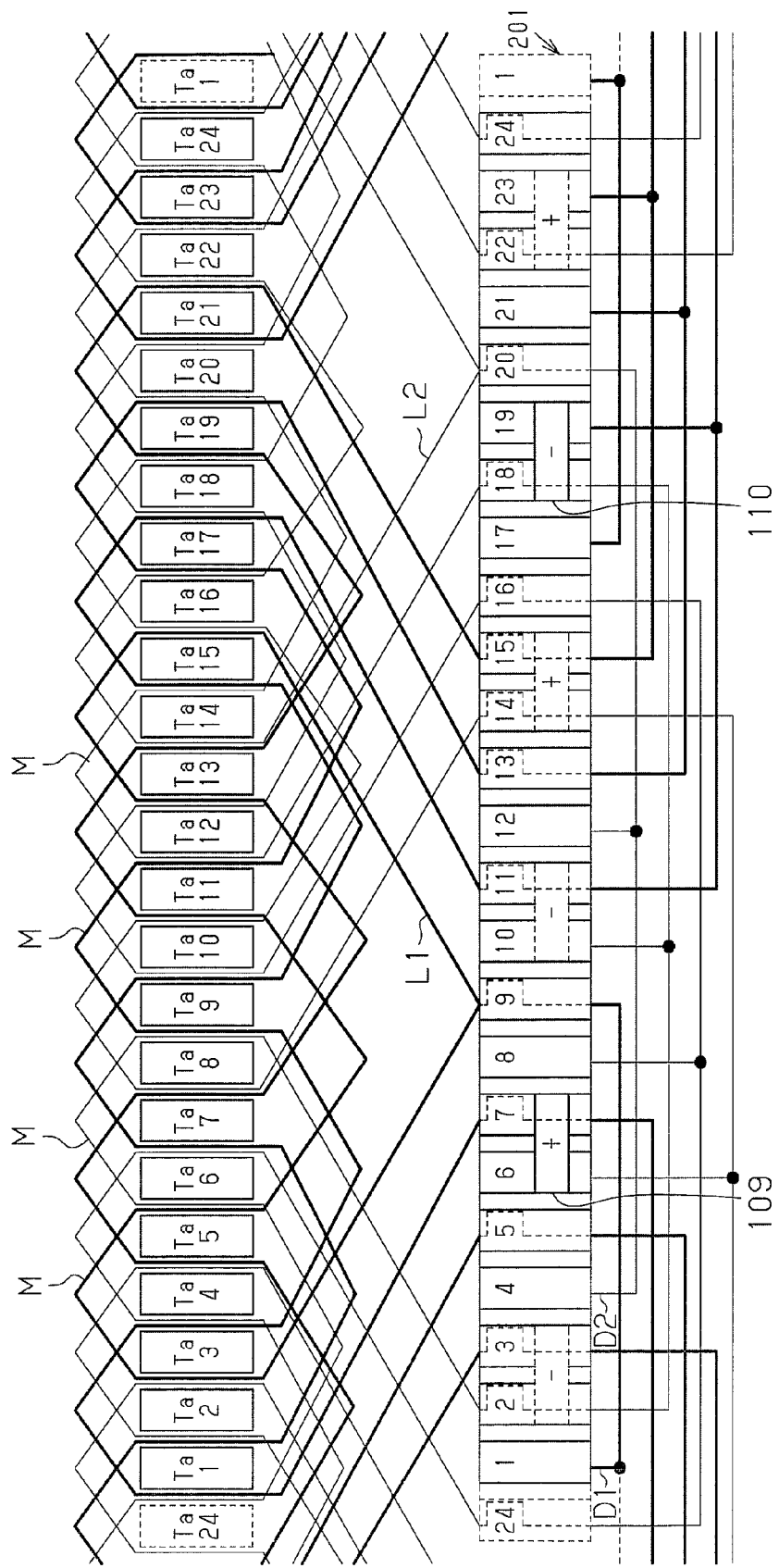
FIG. 15 is a developed view showing a direct current motor according to a sixth embodiment of the present invention.

FIG. 15 is a developed view showing the direct current motor according to the sixth embodiment of the present invention.

As shown in FIG. 15, the first short-circuit piece 116 and the second short-circuit piece 117 are eliminated from the commutator 201 according to the sixth embodiment. A first conducting wire D1 shown by a thick line and a second conducting wire D2 shown by a thin line respectively electrically connect segments from among twenty-four segments 1 to 24 at an interval of 120 degrees, that is to say, skipping seven segments. That is to say, the first conducting wire D1 and the second conducting wire D2 form a short-circuit conductor.

As shown in the bottom half of FIG. 15, a first end of the first conducting wire D1 shown by a thick line is connected to the segment 17, and a second end of the first conducting wire D1 is connected to the segment 9. The first conducting wire D1 is tied and connected to the segment 1 from the segment 17, and furthermore, tied and connected to the segment 9, wound around the teeth Ta3, Ta4 and Ta5 by way of distributed winding as shown in the top half of FIG. 15, wound around the teeth Ta11, Ta12 and Ta13, and then the teeth Ta19, Ta20 and Ta21 by way of distributed winding, and thus, tied and connected to the segment 15. Furthermore, the first conducting wire D1 is tied and connected to the segment 23 from the segment 15, and moreover, tied and connected to the segment 7, wound around the teeth Ta1, Ta2 and Ta3 by way of distributed winding, and then wound around the teeth Ta9, Ta10, Ta11 and then the teeth Ta17, Ta18 and Ta19 by way of distributed winding, and thus, tied and connected to the segment 13.

Furthermore, the first conducting wire D1 is tied and connected to the segment 21 from the segment 13, and moreover, tied and connected to the segment 5, wound around the teeth Ta23, Ta24 and Ta1 by way of distributed winding, wound around the teeth Ta7, Ta8 and Ta9, and then the teeth Ta15, Ta16 and Ta17 by way of distributed winding, and then tied and connected to the segment 11. Furthermore, the first conducting wire D1 is tied and connected to the segment 19 from the segment 11, and moreover, tied and connected to the segment 3, wound around the teeth Ta21, Ta22 and Ta23, and then the teeth Ta5, Ta6 and Ta7 by way of distributed winding, and moreover, wound around the teeth Ta13, Ta14 and Ta15 by way of distributed winding so that the respective coils M are formed, and after that, extends toward the segment 9. In this manner, the first conducting wire D1 forms a first closed loop L1.

In the same manner, as shown in FIG. 15, a first end of the second conducting wire D2 shown by a thin line is connected to the segment 4, and a second end of the second conducting wire D2 is connected to the segment 20. The second conducting wire D2 is tied and connected to the segment 12 from the segment 4, and furthermore, tied and connected to the segment 20, wound around the teeth Ta14, Ta15 and Ta16 by way of distributed winding, and wound around the teeth Ta22, Ta23 and Ta24, and then the teeth Ta6, Ta7 and Ta8 by way of distributed winding, and thus, tied and connected to the segment 2. Furthermore, the second conducting wire D2 is tied and connected to the segment 10 from the segment 2, and moreover, tied and connected to the segment 18, wound around the teeth Ta12, Ta13 and Ta14 by way of distributed winding, and wound around the teeth Ta20, Ta21 and Ta22, and then the teeth Ta4, Ta5 and Ta6 by way of distributed winding, and thus, tied and connected to the segment 24.

Furthermore, the second conducting wire D2 is tied and connected to the segment 8 from the segment 24, and moreover, tied and connected to the segment 16, wound around the teeth Ta10, Ta11 and Ta12 by way of distributed winding, and wound around the teeth Ta18, Ta19 and Ta20, and then the teeth Ta2, Ta3 and Ta4 by way of distributed winding, and thus, tied and connected to the segment 22. Furthermore, the second conducting wire D2 is tied and connected to the segment 6 from the segment 22, and moreover, tied and connected to the segment 14, wound around the teeth Ta8, Ta9 and Ta10 by way of distributed winding, and wound around the teeth Ta16, Ta17 and Ta18, and then the teeth Ta24, Ta1 and Ta2 by way of distributed winding so that the respective coils M are formed, and then extends toward the segment 20. In this manner, the second conducting wire D2 forms a second closed loop L2.

Accordingly, in the sixth embodiment of FIG. 15, the number of the conducting wires D1 and D2 is two, the number of the end portions of the conducting wires D1 and D2 is four in total, and thus, the process for connecting the wires is easy. Furthermore, the first conducting wire D1 and the second conducting wire D2 function as a short-circuit conductor, and therefore, the first short-circuit piece 116 and the second short-circuit piece 117 can be eliminated so that the number of parts can be reduced.

FIG. 16 is a developed view showing the direct current motor according to the seventh embodiment of the present invention.

As shown in FIG. 16, the armature core according to the seventh embodiment has thirty-six teeth Tb1 to Tb36, and first to third conducting wires D1 to D3 are respectively wound around these teeth Tb1 to Tb36. In FIG. 16, the first conducting wire D1 is shown by a thick line, the second conducting wire D2 is shown by a thin line and the third conducting wire D3 is shown by a medium line, and the first to third conducting wires D1 to D3 respectively form first to third closed loops L1 to L3. The top half of FIG. 16 shows the teeth Tb1 to Tb20, and the bottom half of FIG. 16 shows the teeth Tb19 to Tb36. The commutator is provided with thirty-six segments 1 to 36, and the first short-circuit piece 116 and the second short-circuit piece 117 of the short-circuit member 301 respectively electrically connect segments 1 to 36 at an interval of 120 degrees, that is to say, skipping eleven segments. In the seventh embodiment, n=3, and therefore, the angular width WB of each of the anode brush 302 and the cathode brush 303 satisfies (3−1)(WS+WU)+WU<WB<3 (WS+WU)+WU.

As shown in FIG. 16, first and second ends of the first conducting wire D1 are both connected to the segment 1. The first conducting wire D1 is wound around the teeth Tb28, Tb29, Tb30, Tb31 and Tb32 by way of distributed winding from the segment 1, wound around the teeth Tb4, Tb5, Tb6, Tb7 and Tb8, and then the teeth Tb16, Tb17, Tb18, Tb19 and Tb20 by way of distributed winding, and thus, tied and connected to the segment 10. Furthermore, the first conducting wire D1 is wound around the teeth Tb1, Tb2, Tb3, Tb4 and Tb5 by way of distributed winding from the segment 10, wound around the teeth Tb13, Tb14, Tb15, Tb16 and Tb17, and then the teeth Tb25, Tb26, Tb27, Tb28 and Tb29 by way of distributed winding, and thus, tied and connected to the segment 19.

Furthermore, the first conducting wire D1 is wound around the teeth Tb10, Tb11, Tb12, Tb13 and Tb14 by way of distributed winding from the segment 19, wound around the teeth Tb22, Tb23, Tb24, Tb25 and Tb26, and then the teeth Tb34, Tb35, Tb36, Tb1 and Tb2 by way of distributed winding, and thus, tied and connected to the segment 28. Furthermore, the first conducting wire D1 is wound around the teeth Tb19, Tb20, Tb21, Tb22 and Tb23 by way of distributed winding from the segment 28, wound around the teeth Tb31, Tb32, Tb33, Tb34 and Tb35, and then the teeth Tb7, Tb8, Tb9, Tb10 and Tb11 by way of distributed winding so that the respective coils M are formed, and then extends toward the segment 1. In this manner, the first conducting wire D1 forms a first closed loop L1.

In the same manner, as shown in FIG. 16, first and second ends of the second conducting wire D2 are both connected to the segment 3. The second conducting wire D2 is wound around the teeth Tb30, Tb31, Tb32, Tb33 and Tb34 by way of distributed winding from the segment 3, wound around the teeth Tb6, Tb7, Tb8, Tb9 and Tb10, and then the teeth Tb18, Tb19, Tb20, Tb21 and Tb22 by way of distributed winding, and thus, tied and connected to the segment 12. Furthermore, the second conducting wire D2 is wound around the teeth Tb3, Tb4, Tb5, Tb6 and Tb7 by way of distributed winding from the segment 12, wound around the teeth Tb15, Tb16, Tb17, Tb18 and Tb19, and then the teeth Tb27, Tb28, Tb29, Tb30 and Tb31 by way of distributed winding, and thus, tied and connected to the segment 21.

Furthermore, the second conducting wire D2 is wound around the teeth Tb12, Tb13, Tb14, Tb15 and Tb16 by way of distributed winding from the segment 21, wound around the teeth Tb24, Tb25, Tb26, Tb27 and Tb28, and then the teeth Tb36, Tb1, Tb2, Tb3 and Tb4 by way of distributed winding, and thus, tied and connected to the segment 30. Furthermore, the second conducting wire D2 is wound around the teeth Tb21, Tb22, Tb23, Tb24 and Tb25 by way of distributed winding from the segment 30, wound around the teeth Tb33, Tb34, Tb35, Tb36 and Tb1, and then the teeth Tb9, Tb10, Tb11, Tb12 and Tb13 by way of distributed winding so that the respective coils M are formed, and thus, extends toward the segment 3. In this manner, the second conducting wire D2 forms a second closed loop L2.

In the same manner, as shown in FIG. 16, first and second ends of the third conducting wire D3 are both connected to the segment 5. The third conducting wire D3 is wound around the teeth Tb32, Tb33, Tb34, Tb35 and Tb36 by way of distributed winding from the segment 5, wound around the teeth Tb8, Tb9, Tb10, Tb11 and Tb12, and then the teeth Tb20, Tb21, Tb22, Tb23 and Tb24, and thus, tied and connected to the segment 14. Furthermore, the third conducting wire D3 is wound around the teeth Tb5, Tb6, Tb7, Tb8 and Tb9 by way of distributed winding from the segment 14, wound around the teeth Tb17, Tb18, Tb19, Tb20 and Tb21, and then the teeth Tb29, Tb30, Tb31, Tb32 and Tb33 by way of distributed winding, and thus, tied and connected to the segment 23.

Furthermore, the third conducting wire D3 is wound around the teeth Tb14, Tb15, Tb16, Tb17 and Tb18 by way of distributed winding from the segment 23, wound around the teeth Tb26, Tb27, Tb28, Tb29 and Tb30, and then the teeth Tb2, Tb3, Tb4, Tb5 and Tb6 by way of distributed winding, and thus, tied and connected to the segment 32. Furthermore, the third conducting wire D3 is wound around the teeth Tb23, Tb24, Tb25, Tb26 and Tb27 by way of distributed winding from the segment 32, wound around the teeth Tb35, Tb36, Tb1, Tb2 and Tb3, and then the teeth Tb11, Tb12, Tb13, Tb14 and Tb15 by way of distributed winding so that the respective coils M are formed, and thus, extends toward the segment 5. In this manner, the third conducting wire D3 forms a third closed loop L3.

Accordingly, the segments 1, 10, 19 and 28, which correspond to the first closed loop L1, the segments 3, 12, 21 and 30, which correspond to the second closed loop L2, and the segments 5, 14, 23 and 32, which correspond to the third closed loop L3, are alternately arranged in the circumferential direction. Accordingly, the seventh embodiment of FIG. 16 has first to third closed loops L1 to L3, and therefore, the number of the paths for the main current is three times, that is to say, n times greater than in the case where, for example, the direct current motor has one closed loop, and thus, the cross-sectional area of the first short-circuit piece 116 and the second short-circuit piece 117 can be reduced to ⅓.

In the following, eighth to seventeenth embodiments of FIGS. 17 to 29 include a modification of the anode brush 109 and the cathode brush 110.

Figure 17:
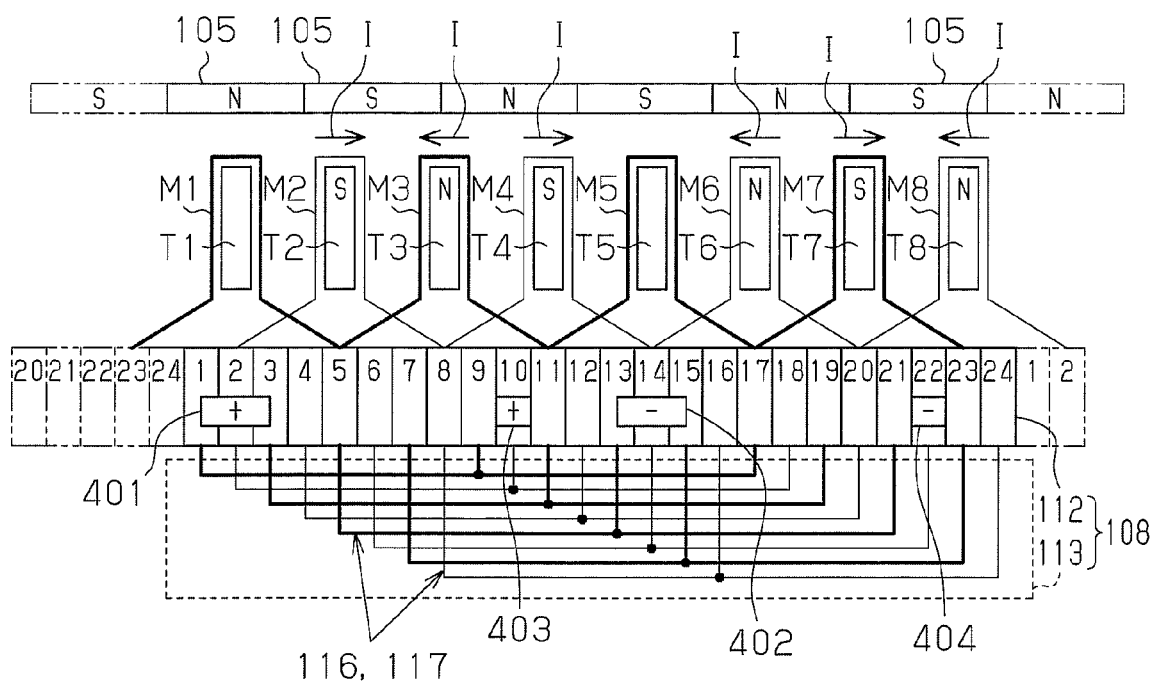
FIG. 17 is a developed view showing a direct current motor according to an eighth embodiment of the present invention.
Figure 18A:
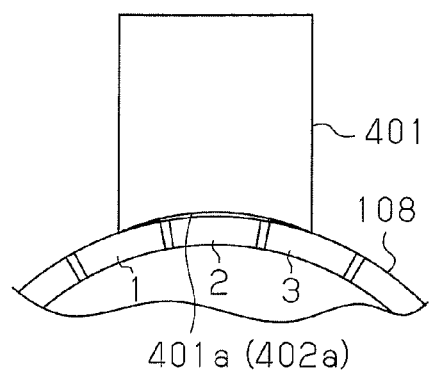
FIG. 18A is an enlarged view showing one of the wide brushes in FIG. 17.
Figure 18B:
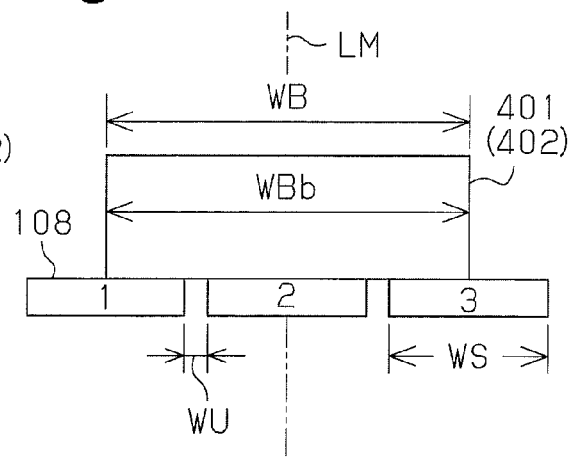
FIG. 18B is a developed view of FIG. 18A.
Figure 18C:
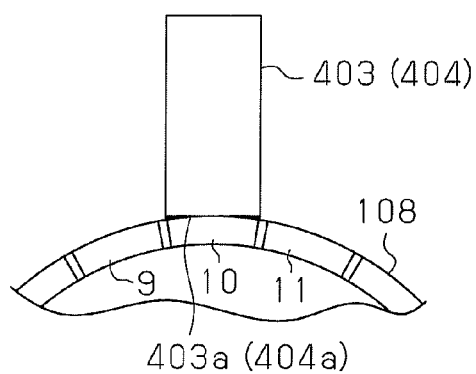
FIG. 18C is an enlarged view showing one of the narrow brushes in FIG. 17.
Figure 18D:
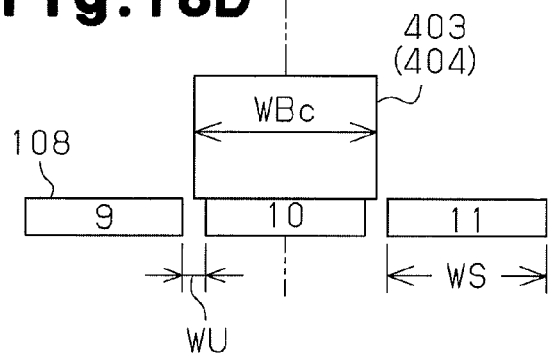
FIG. 18D is a developed view of FIG. 18C.

FIGS. 17 to 18D are developed views showing the direct current motor according to the eighth embodiment of the present invention.

As shown in FIG. 17, the anode brush in the eighth embodiment includes a wide brush 401 and a narrow brush 403, while the cathode brush includes a wide brush 402 and a narrow brush 404. That is to say, the wide brush 401 and the narrow brush 403 are both brushes of the same pole for the anode, while the wide brush 402 and the narrow brush 404 are both brushes of the same pole for the cathode. Parts of the configuration of the eighth embodiment other than the wide brushes 401 and 402 as well as the narrow brushes 403 and 404, for example, the coils M1 to M8, are the same as in the second embodiment of FIG. 10. That is to say, the number of the anode brushes 109 is not limited to one and may be formed of a plurality of brushes of the same pole (401, 403), and the number of the cathode brushes 110 is not limited to one and may be formed of a plurality of brushes of the same pole (402, 404).

As shown in FIG. 18B, a large angular width WBb, which is the angular width of each of the wide brushes 401 and 402, satisfies (n−1)(WS+WU)+WU<WBb<n(WS+WU)+WU, where n is an integer no less than two. In the present embodiment, n=2, and therefore, the large angular width is set as WBb=2WS+2WU. That is to say, the large angular width WBb corresponds to the substantial angular width WD of the number of brushes of the same pole, and thus, can be the to satisfy the above described condition formula (n−1)(WS+WU)+WU<WB<n(WS+WU)+WU, where n is an integer no less than two.

As shown in FIG. 18D, a small angular width WBc, which is the angular width of each of the narrow brushes 403 and 404, satisfies WBc<(n−1)(WS+WU)+WU. In the present embodiment, n=2, and therefore, the small angular width is set as WBc=WS+WU. As a result, the narrow brushes 403 and 404 hardly lift from the respective segments 1 to 24, and thus, they contact one segment 1 to 24 without fail.

As shown in FIG. 17, the circumferential center of the narrow brush 403 is placed at a location at the short-circuit pitch of the short-circuit member 113, that is to say, 120 degrees from the circumferential center of the wide brush 401. In the same manner, the circumferential center of the narrow brush 404 is placed at a location at the short-circuit pitch of the short-circuit member 113, that is to say, 120 degrees from the circumferential center of the wide brush 402.

As shown in FIG. 18B, in a state where the wide brush 401 contacts the segments 1 to 3, the narrow brush 403 contacts the segment 10 as shown in FIG. 18D. As a result of the short-circuit by the short-circuit member 113, the segment 1 is at the same potential as the segment 9, the segment 2 is at the same potential as the segment 10, and the segment 3 is at the same potential as the segment 11. FIGS. 18B and 18D show that the segments 1 and 9, which are at the same potential, are vertically arranged, the segments 2 and 10, which are at the same potential and a potential different from the above, are vertically arranged, and the segments 3 and 11, which are at the same potential and a potential still different from the above, are vertically arranged. The anode brush includes a wide brush 401 which contacts the segment 2 and the narrow brush 403 which contacts the segment 10 which at the same potential as the segment 2. As shown in FIG. 17, the cathode brush includes the wide brush 402 which contacts the segment 14 and the narrow brush 404 which contacts the segment 22 which is at the same potential as the segment 14. That is to say, at least the anode brush or the cathode brush may include a plurality of brushes of the same pole which respectively contact a plurality of segments which are short-circuited by the short-circuit member 113 so as to be at the same potential.

The two-dot chain line LM which crosses over from FIG. 18B to FIG. 18D passes through the circumferential centers of the segments 2 and 10, respectively. As shown in FIG. 18B, in a state where the circumferential center of the wide brush 401 is located on the two-dot chain line LM, the circumferential center of the narrow brush 403 is located on the two-dot chain line LM, as shown in FIG. 18B. That is to say, FIGS. 18B and 18D schematically show that the circumferential center of the narrow brush 403 is located at the short-circuit pitch, that is to say, 120 degrees, from the short-circuit member 113 from the circumferential center of the wide brush 401.

In the case where the wide brush 401 contacts three or more segments 1 to 3 arranged in the circumferential direction at the same time, the wide brush 401 may lift off the segment 2 in the middle in the circumferential direction. However, the narrow brush 403, which hardly lifts, contacts the segment 10, which is at the same potential as the segment 2 in the middle in the circumferential direction. Accordingly, the combination of the wide brush 401 and the narrow brush 403 according to the present embodiment makes it possible to reduce contact failure due to lifting off the segments 1 to 24.

Accordingly, in the eighth embodiment in FIGS. 17 to 18D, contact failure between the brushes 401 to 404 and the segments 1 to 24 can be reduced in comparison with the case of only one anode brush 109 and only one cathode brush 110 (case of FIG. 1). Therefore, the direct current motor having wide brushes 401 and 402 with an angular width WB which is set at a value which is sufficiently high to satisfy (n−1)(WS+WU)+WU<WB<n(WS+WU)+WU can be sufficiently prevented from becoming unstable in energization.

As shown in FIG. 18A, the end portions of the wide brushes 401 and 402 facing the commutator 108 have arcuate sliding surfaces 401a and 402a. The sliding surfaces 401a and 402a each have a radius of curvature which is smaller than the radius of curvature of the commutator 108 when viewed in the axial direction of the rotary shaft 106 in the initial state. The initial state refers to a stage where the wide brushes 401 and 402, for example, are shipped as a product. The sliding surfaces 401a and 402a are end surfaces of the wide brushes 401 and 402 facing the commutator 108, and radial inner end surfaces of the wide brushes 401 and 402. Therefore, the wide brushes 401 and 402 easily make reliable contact with the segments 1 and 3 on both sides from among three or more segments 1 to 3 arranged in the circumferential direction. Therefore, the wide brushes 401 and 402 are reliably prevented from lifting off the segments 1 and 3 on both sides. The narrow brushes 403 and 404 contact the segment 2 in the middle, and therefore, the anode brush and the cathode brush easily make reliable contact with the commutator 108.

As shown in FIG. 18C, end portions of the narrow brushes 403 and 404 facing the commutator 108 have arcuate sliding surfaces 403a and 404a, respectively. The sliding surfaces 403a and 404a each have a radius of curvature which is greater than the radius of curvature of the commutator 108 when viewed in the axial direction in the initial state. Therefore, the narrow brushes 403 and 404 easily make reliable contact with the segment 2 in the middle from among three or more segments 1 to 3 arranged in the circumferential direction.

Figure 19A:
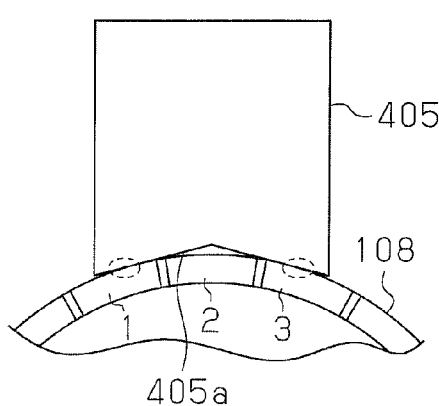
FIG. 19A is an enlarged view showing a wide brush according to a ninth embodiment of the present invention.
Figure 19B:
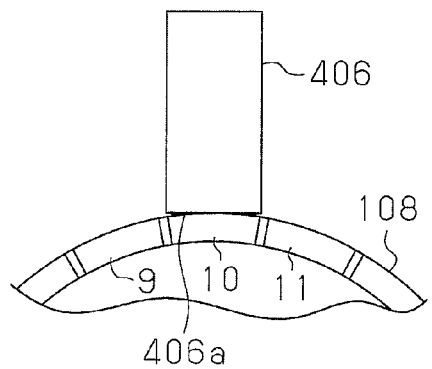
FIG. 19B is an enlarged view showing a narrow brush.

FIGS. 19A and 19B show the ninth embodiment of the present invention.

As shown in FIG. 19A, the sliding surface 405a of the wide brush 405 according to the ninth embodiment is V-shaped when viewed in the axial direction in the initial state. Accordingly, the wide brush 405 easily contacts the segment 1 and 3 in the two portions surrounded by broken lines in FIG. 19A. That is to say, it is possible for the sliding surface 405a to contact the commutator 108 in the vicinity of both circumferential ends of the wide brush 405. The ninth embodiment has the same advantages as the eighth embodiment in FIG. 18A. In addition, the edges of the wide brush 405 hardly collide with the edges of the segments 1 to 24. As a result, noise caused by collision between edges is reduced.

As shown in FIG. 19B, the sliding surface 406a of the narrow brush 406 according to the ninth embodiment is tabular in the initial state, and the circumferential center portion of the sliding surface 406a contacts the segment 10, and therefore, the narrow brush 406 makes reliable contact with one segment 1 to 24.

Figure 20:
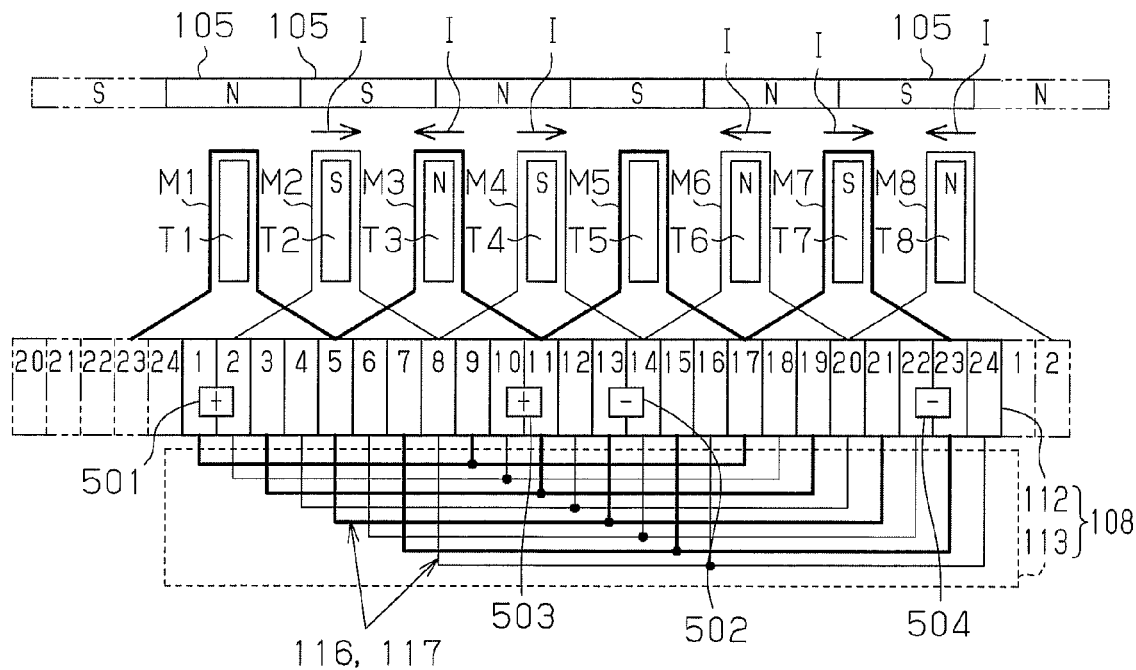
FIG. 20 is a developed view showing a direct current motor according to a tenth embodiment of the present invention.
Figure 21:
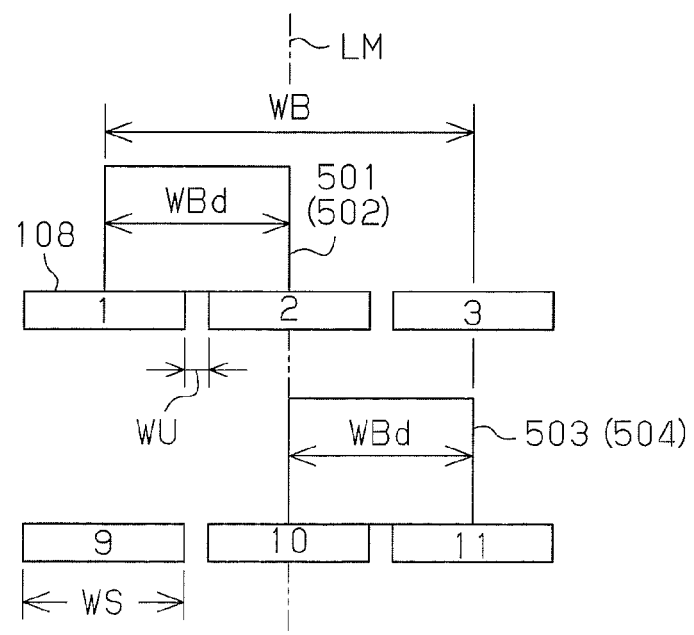
FIG. 21 is an enlarged view showing the first brush and the second brush of FIG. 20.

FIGS. 20 and 21 are developed views showing the direct current motor according to the tenth embodiment of the present invention.

As shown in FIG. 20, the anode brush in the tenth embodiment includes a first brush 501 and a second brush 503, while the cathode brush includes a first brush 502 and a second brush 504. That is to say, the first brush 501 and the second brush 503 are respective brushes of the same anode pole while the first brush 502 and the second brush 504 are respective brushes of the same cathode pole. The first brushes 501 and 502 and the second brushes 503 and 504 all have the same angular width WBd. FIG. 21 shows the segments 1 and 9 which are short-circuited by the short-circuit member 113 so as to be at the same potential and vertically arranged, the segments 2 and 10 which are at the same potential and a potential different from the above and vertically arranged, and the segments 3 and 11 which are at the same potential and a potential still different from the above and vertically arranged.

As shown in FIG. 21, a first circumferential end of the first brush 501 (right end in FIG. 21) and a second circumferential end of the second brush 503 (left end in FIG. 21) are located on the two-dot chain line LM. That is to say, the first circumferential end of the first brush 501 (right end) is at the short-circuit pitch, that is to say, 120 degrees, from the second circumferential end of the second brush 503 (left end). The first circumferential end of the first brush 501 (right end) and the second circumferential end of the second brush 503 (left end) are ends of the first brush 501 and the second brush 503 on different sides in the circumferential direction.

As shown in FIG. 21, the second brush 503 contacts the segments 10 and 11 in a state where the first brush 501 contacts the segments 1 and 2. The segments 10 and 11 are, respectively, short-circuited to the segments 2 and 3 by the short-circuit member 113, and therefore, the second brush 503 can be considered to substantially contact the segments 2 and 3. That is to say, the first brush 501 and the second brush 503 can be considered to substantially continue in the circumferential direction. That is to say, the first brush 501 and the second brush 503 appear and are considered to function as one brush which contacts the segments 1 to 3. Therefore, the sum 2 WBd of the angular width WBd of the first brush 501 and the angular width WBd of the second brush 503 corresponds to the angular width WB of one anode brush 109. In the same manner, the sum 2 WBd of the angular width WBd of the first brush 502 and the angular width WBd of the second brush 504 substantially corresponds to the angular width WB of one cathode brush 110. Therefore, the angular width WBd of each of the first brushes 501 and 502 and the second brushes 503 and 504 satisfies $nWS/2 < WBd < (n(WS+WU)+WU)/2$. In the present embodiment, n=2, and therefore, WBd is set as WBd=WS+WU, so that $WS < WBd < (WS+WU)+WU$ is satisfied.

As shown in FIG. 21, the circumferential center of the second brush 503, 504 is placed at a point displaced further from the location at the short-circuit pitch, that is to say, 120 degrees, from the above described short-circuit member 113 from the center circumferential of the first brush 501, 502. The angular width WBd of each of the first brush 501, 502 and the second brush 503, 504 is set so that this displacement allows the substantial angular width WB=2WBd of each of the anode brush and the cathode brush to satisfy the condition $(n-1)(WS+WU)+WU < WB < n(WS+WU)+WU$.

The tenth embodiment in FIG. 21 further has the following advantages.

(5) The angular width WBd of each brush 501 to 504 in FIG. 21 is made smaller than the angular width WB in FIG. 8. Accordingly, lifting off of the brushes 501 to 504 from the segments 1 to 24, which easily occurs in the case where the angular width WBd of the brushes 501 to 504 is great, is reduced, and contact failure between the brushes 501 to 504 and the segments 1 to 24 is reduced.

(6) The first brush 501 and the second brush 503 of the anode are placed so as to be substantially continuous in the circumferential direction. In the same manner, the first brush 502 and the second brush 504 of the cathode are placed so as to be substantially continuous in the circumferential direction. Therefore, the stability in contact between the brushes 501 to 504 and the segments 1 to 24 increases in comparison with the case where the first brush 501 and the second brush 503, for example, are substantially placed at a distance from each other in the circumferential direction. In addition, the angular width WBd of each of the brushes 501 to 504 satisfies $nWS/2 < WBd < (n(WS+WU)+WU)/2$, and therefore, the substantial angular width WB of the entirety of the anode brush can be increased, as long as $nWS < WB < n(WS+WU)+WU$ is satisfied. As a result, a large current can be made to flow through the commutator 108, through the brushes 501 to 504.

Figure 22:
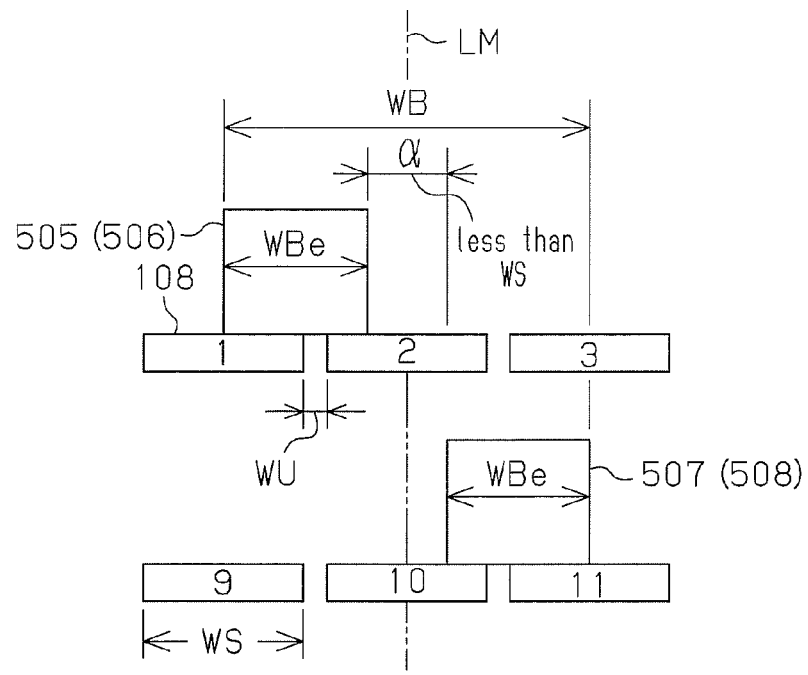
FIG. 22 is a developed view showing a first brush and a second brush according to an eleventh embodiment of the present invention.

FIG. 22 is a developed view showing the direct current motor according to the eleventh embodiment of the present invention.

The first brush 505 and the second brush 507 according to the eleventh embodiment shown in FIG. 22 are placed substantially at a distance from each other in the circumferential direction. That is to say, the distance between the first circumferential end of the first brush 505 (right end in FIG. 22) and the second circumferential end of the second brush 507 (left end) is greater than the short-circuit pitch, that is to say, 120 degrees, and the difference between the distance and the short-circuit pitch is less than the angular width WS of one segment 1 to 24. As a result, the first brush 505 and the second brush 507 are at a distance of substantially less than WS in the circumferential direction. Likewise, the distance between the first circumferential end of the first brush 506 of the cathode (right end) and the second circumferential end of the second brush 508 (left end) is greater than the short-circuit pitch, and the difference between the distance and the short-circuit pitch is less than the angular width WS. The sum of the angular width WBe of the first brush 501, the angular width WBe of the second brush 507 and the substantial space α (α<WS) between the first brush 501 and the second brush 507 is the substantial angular width WB=2WBe+α of the entirety of the anode brush, and it is necessary for the substantial angular width WB to satisfy the condition formula $(n-1)(WS+WU)+WU < WB < n(WS+WU)+WU$.

Thus, the angular width WBe of each of the brushes 505 to 508 in FIG. 22 can be made smaller than in the case of FIG. 21, and therefore, the material for the brushes 505 to 508 can be reduced, and it becomes easy to prevent the brushes 505 to 508 from lifting off the segment 1 to 24.

Figure 23:
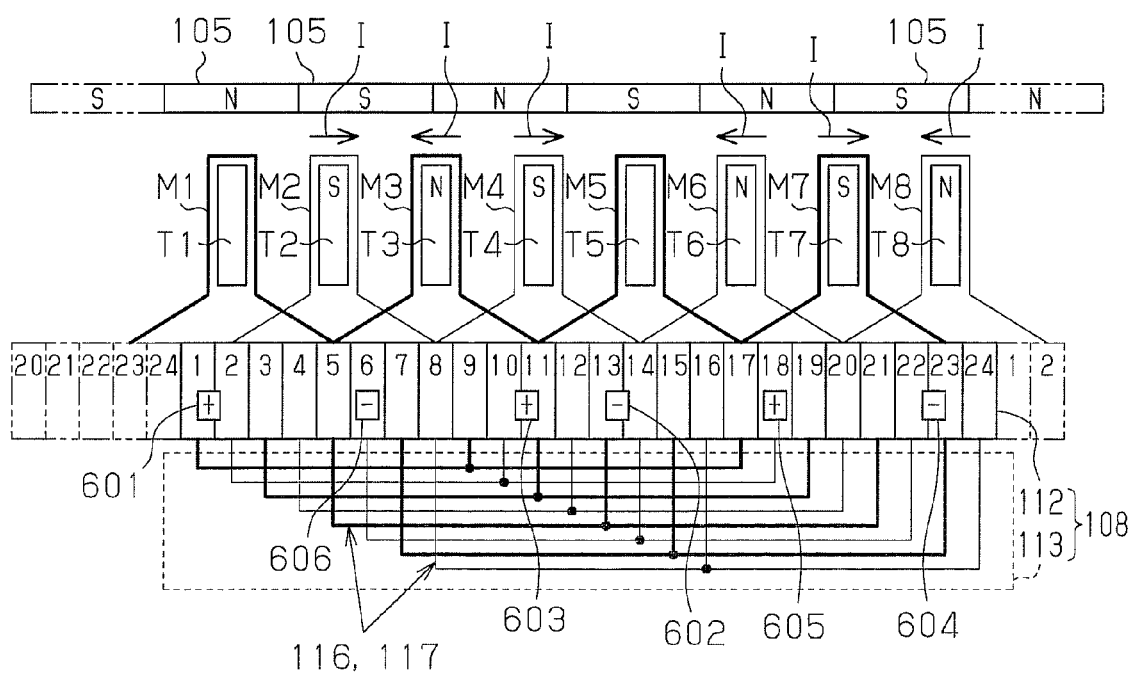
FIG. 23 is a developed view showing a direct current motor according to a twelfth embodiment of the present invention.
Figure 24:
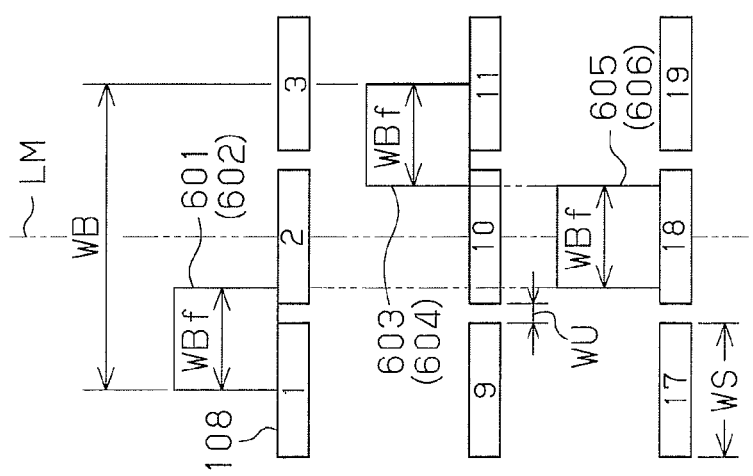
FIG. 24 is an enlarged view showing the first brush, the second brush, and the middle brush in FIG. 23.

FIGS. 23 and 24 are developed views showing the direct current motor according to the twelfth embodiment of the present invention.

As shown in FIG. 23, the brushes of the same pole in the anode brush according to the twelfth embodiment include a first brush 601, a second brush 603 and a middle brush 605, while the brushes of the same pole in the cathode brush include a first brush 602, a second brush 604 and a middle brush 606. FIG. 24 shows the segments 1, 9 and 17, which are short-circuited to each other by the short-circuit member 113 so as to be at the same potential and vertically arranged, the segments 2, 10 and 18, which are at the same potential and a potential different from the above and vertically arranged, and the segments 3, 11 and 19, which are at the same potential and a potential still different from the above and vertically arranged.

In the case of FIG. 24, the first brush 601 contacts the segments 1 and 2, the second brush 603 contacts the segments 10 and 11, and the middle brush 605 contacts the segment 18. That is to say, the middle brush 605 is placed substantially between the first brush 601 and the second brush 603. The distance between the first circumferential end of the first brush 601 (right end in FIG. 24) and the second circumferential end of the second brush 603 (left end) is greater than the short-circuit pitch, that is to say, 120 degrees. The distance between the first circumferential end of the first brush 601 (right end) and the second circumferential end of the middle brush 605 (left end) is twice the short-circuit pitch, that is to say, 240 degrees, and the distance between the second circumferential end of the second brush 603 (left end) and the first circumferential end of the middle brush 605 (right end) is the same as the short-circuit pitch, that is to say, 120 degrees. That is to say, the middle brush 605 substantially continues to the first brush 601 and the second brush 603 in the circumferential direction. It can be said that the circumferential center of the middle brush 605 is at a point displaced further from the location at the short-circuit pitch, that is to say, 120 degrees, from the circumferential center of the first brush 601, and further the circumferential center of the middle brush 605 is at the point displaced further from the location at the short-circuit pitch from the circumferential center of the second brush 603.

Likewise, the middle brush 606 is placed substantially between the first brush 602 and the second brush 604. The distance between the first circumferential end of the first brush 602 (right end) and the second circumferential end of the middle brush 606 (left end) is twice the short-circuit pitch, that is to say, 240 degrees, and the distance between the second circumferential end of the second brush 604 (left end) and the first circumferential end of the middle brush 606 (right end) is the same as the short-circuit pitch, that is to say, 120 degrees. That is to say, the middle brush 606 substantially continues to the first brush 602 and the second brush 604 in the circumferential direction. The angular width WBf of each of the first brush 601 and 602, the second brush 603 and 604 and the middle brush 605 and 606 is set as WBf=(2WS+2WU)/3.

The twelfth embodiment in FIGS. 23 and 24 is provided with the middle brushes 605 and 606, and therefore, the angular width WBf of each of the brushes 601 to 606 is further reduced in comparison with the case of, for example, FIG. 21. Accordingly, lifting off of the brushes 601 to 606 from the segments 1 to 24 can further be reduced, unlike with brushes having a great angular width. Thus, contact failure between the brushes 601 to 606 and the segments 1 to 24 can further be reduced. Each of the brushes 601 to 606 having a small angular width WBf contacts and slides against the segments 1 to 24 in such a manner as to become very compatible in a short period of time, and thus, contact failure can be reduced.

A high resistance portion Rb may be provided to brushes of the same pole in FIGS. 17 to 24. FIGS. 25 to 29 show the fourteenth to eighteenth embodiments having a high resistance portion Rb.

Figure 25:
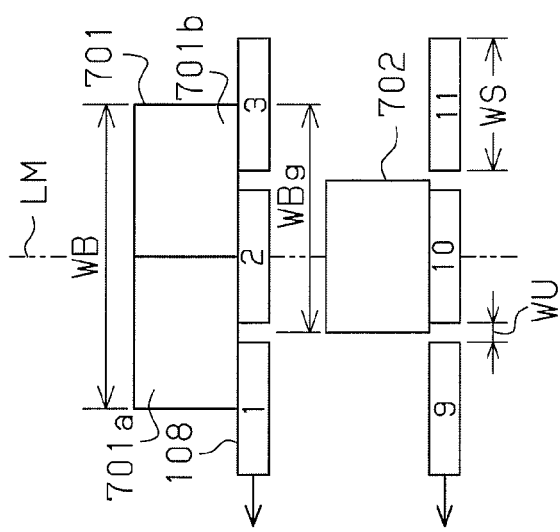
FIG. 25 is a developed view showing a wide brush and a narrow brush according to a thirteenth embodiment of the present invention.

FIG. 25 is a developed view showing the direct current motor according to the thirteenth embodiment of the present invention.

The segments 1 to 24 and the armature 103 in FIG. 25 rotate only in one direction, that is to say, to the left in FIG. 25. FIG. 25 shows a wide brush 701 and a narrow brush 702 which are brushes of the same cathode. The wide brush 701 has a high resistance portion 701a on the trailing side in the direction in which the segments 1 to 24 rotate, and a low resistance portion 701b on the leading side. In a state where the high resistance portion 701a contacts the segments 1 and 2 and the low resistance portion 701b contacts the segments 2 and 3, the narrow brush 702 contacts the segment 10, which is at the same potential as the segment 2. That is to say, the high resistance portion 701a is a portion which is later than the wide brush 701 in separating from each of the segments 1 to 24. The resistivity of the high resistance portion 701a is higher than the resistivity of the low resistance portion 701b and the narrow brush 702. The angular width WBg between the leading end of the low resistance portion 701b in the direction of rotation (right end in FIG. 25) and the trailing end of the narrow brush 702 in the direction of rotation (left end in FIG. 25) is a substantial angular width of the low resistance portion in the anode brush. The angular width WBg satisfies (n−1)(WS+WU)+WU<WBg.

Figure 26:
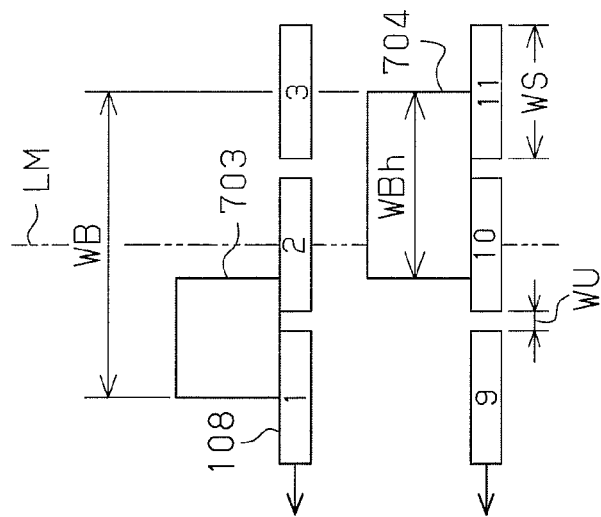
FIG. 26 is a developed view showing a wide brush and a narrow brush according to a fourteenth embodiment of the present invention.

FIG. 26 is a developed view showing the direct current motor according to the fourteenth embodiment of the present invention.

FIG. 26 shows a narrow brush 703 and a wide brush 704 which are brushes of the same anode pole. The segments 1 to 24 rotate only in one direction, that is to say, to the left in FIG. 26. In a state where the narrow brush 703 contacts the segments 1 and 2, the wide brush 704 contacts the segments 10 and 11. The narrow brush 703 is substantially located on the trailing side of the commutator 108 in the direction of rotation, and the wide brush 704 is located on the leading side. The entirety of the narrow brush 703 which is substantially later in separating from each of the segments 1 to 24 has a resistance which is higher than that of the wide brush 704. The angular width WBh of the wide brush 704 corresponds to the angular width of the low resistance portion of the anode brush, and the angular width WBh satisfies (n−1)(WS+WU)+WU<WBh.

Figure 27:
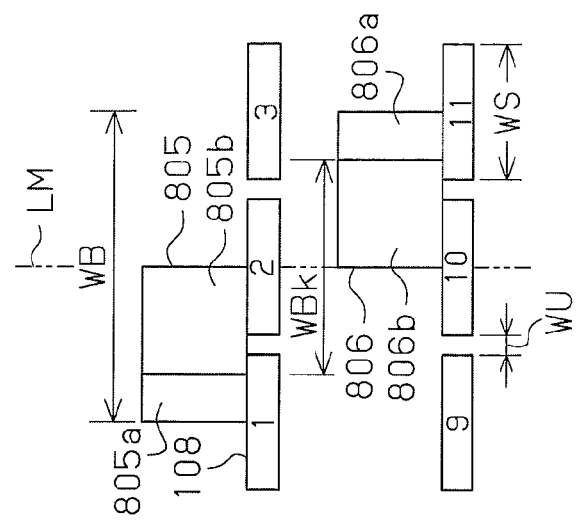
FIG. 27 is a developed view showing a wide brush and a narrow brush according to a fifteenth embodiment of the present invention.

FIG. 27 is a developed view showing the direct current motor according to the fifteenth embodiment of the present invention.

FIG. 27 shows a wide brush 801 and a narrow brush 802 as brushes of the same anode pole. The direct current motor according to the present embodiment can rotate both forward and backward, that is to say, the segments 1 to 24 are rotatable in both directions, left and right directions in FIG. 27. The wide brush 801 has a pair of high resistance portions 801a which are located at the two circumferential ends, and a low resistance portion 801b which is located at the circumferential center. The resistivity of the high resistance portions 801a is higher than the resistivity of the low resistance portion 801b and the narrow brush 802. The angular width WBi of the low resistance portion 801b is greater than the angular width of the narrow brush 802, and the angular width of the high resistance portions 801a is smaller than the angular width of the narrow brush 802. In a state where the low resistance portion 801b contacts the segments 1 to 3, the narrow brush 802 in some cases makes contact only with the segment 10. Whichever direction, left or right, the segments 1 to 24 rotate, one of the high resistance portions 801a separates from each of the segments 1 to 24 before the low resistance portion 801b. The angular width WBi of the low resistance portion 801b satisfies (n−1)(WS+WU)+WU<WBi.

Figure 28:
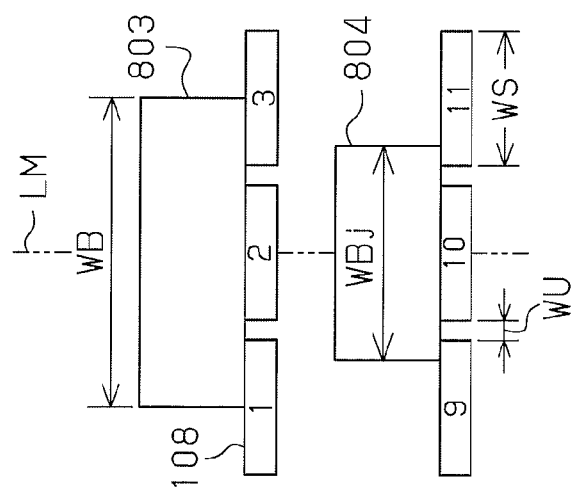
FIG. 28 is a developed view showing a wide brush and a narrow brush according to a sixteenth embodiment of the present invention.

FIG. 28 is a developed view showing the direct current motor according to the sixteenth embodiment of the present invention.

FIG. 28 shows a wide brush 803 and a narrow brush 804 as brushes of the same anode pole. The direct current motor according to the present embodiment can also rotate both forward and backward. The entirety of the wide brush 803 is a high resistance portion of which the resistance is higher than that of the narrow brush 804. In a state where the wide brush 803 contacts the segments 1 to 3, the narrow brush 804 contacts the segments 9 to 11, the angular width of the wide brush is greater than that of the angular width WBj of the narrow brush 804, and the two circumferential ends of the narrow brush 804 substantially fall within the circumferential breadth of the wide brush 803. The angular width WBj of the narrow brush 804 satisfies (n−1)(WS+WU)+WU<WBj.

Figure 29:
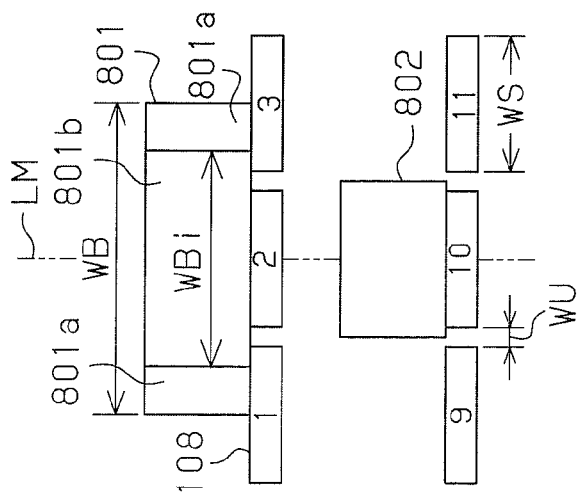
FIG. 29 is a developed view showing a first brush and a second brush according to a seventeenth embodiment of the present invention.

FIG. 29 is a developed view showing the direct current motor according to the seventeenth embodiment of the present invention.

FIG. 29 shows a first brush 805 and a second brush 806 as brushes of the same anode pole. The direct current motor according to the present embodiment can also rotate both forward and backward. In a state where the first brush 805 contacts the segments 1 and 2, the second brush 806 contacts the segments 10 and 11. A first circumferential end of the first brush 805 (right end in FIG. 29) is 120 degrees from a second circumferential end of the second brush 806 (left end in FIG. 29), and the first brush 805 substantially continues to the second brush 806. The first brush 805 has a high resistance portion 805a which is located at a second circumferential end (left end) and a low resistance portion 805b which is located on the first circumferential end (right end) side of the high resistance portion 805a, while the second brush 806 has a high resistance portion 806a which is located at a first circumferential end (right end) and a low resistance portion 806b which is located on the second circumferential end (left end) side of the high resistance portion 805a. That is to say, the low resistance portion 805b substantially continues to the low resistance portion 806b in the circumferential direction.

The high resistance portion 805a in FIG. 29 is substantially later than the low resistance portions 805b and 806b in separating from each of the segments 1 to 24 in the case where the segments 1 to 24 rotate in the right direction, and the high resistance portion 806a is substantially later than the low resistance portions 805b and 806b in separating from each of the segments 1 to 24 in the case where the segments 1 to 24 rotate in the left direction. The angular width WBk, which is the sum of the angular width of the low resistance portion 805b and the angular width of the low resistance portion 806b, satisfies (n−1)(WS+WU)+WU<WBk.

The high resistance portions in these FIGS. 25 to 29 can also reduce sparks caused by the brushes, and as a result, reduce wear of the brush, so that the direct current motor has a longer life.

The above described embodiments may be modified as follows.

As long as it is four or more, the number of magnetic poles of the stator 102 is not limited to six, and even numbers are preferable, for example eight. That is to say, as long as it is four or more, the number of magnets 105 is not limited to six. In addition, the components of the magnetic poles are not limited to the magnets 105.

The number of teeth in the armature core 107 is not limited to eight, twenty-four or thirty-six. The number of teeth may be changed on the basis of the number of magnets 105, or whether the coils are wound by way of concentrated winding or by way of distributed winding.

The number of segments is not limited to twenty-four or thirty-six, and may be changed on the basis of the number of magnets 105 or the number of teeth.

The number of closed loops L1 and L2 is not limited to two or three, and may be four or more. However, it is necessary for the angular width WB of the brushes to satisfy (n−1)(WS+WU)+WU<WB<n(WS+WU)+WU, where n is the same as the number of closed loops.

The low resistance portion Ra and the high resistance portion Rb may be separate bodies which are located so as to be arranged in the axial direction, and the high resistance portion Rb may be placed on the trailing side of the low resistance portion Ra in the direction in which the commutator 108 rotates. In this case also, the high resistance portion Rb is later than the low resistance portion Ra in separating from each of the segments 1 to 24. The low resistance portion Ra and the high resistance portion Rb, which are separate bodies, are easier to manufacture, in some cases, than in the case where the two are formed integrally, and wiring to the low resistance portion Ra and the high resistance portion Rb which are arranged in the axial direction is easy in some cases.

Neither the anode brush 109 nor the cathode brush 110 are limited to brushes having a low resistance portion Ra and a high resistance portion Rb, and each may be changed to a brush where the resistance value is uniform irrespectively of the position.

The short-circuit conductor does not need to be formed of the first short-circuit piece 116, the second short-circuit piece 117 and portions of the first conducting wire D1 and the second conducting wire D2, and may be formed of wires which are independent of the coils M. short-circuit wires made of conducting wires are placed in spaces between the commutator 108 and the armature core 107. In this case also, the cross-sectional area of the short-circuiting wires is made small, and thus, the direct current motor 101 is made compact.

The invention claimed is:
1. A direct current motor, comprising:
a stator having four or more magnetic poles;
an armature which is rotatable relative to the stator, the armature having an armature core and a commutator which rotate integrally, wherein the armature core has a plurality of teeth and a plurality of coils which are respectively wound around the teeth, the commutator has a plurality of segments arranged in a circumferential direction, and a short-circuit conductor for short-circuiting predetermined segments from among the segments, wherein each of the segments has an angular width WS, and there is a gap of an angular width WU between each adjacent pair of the segments; and
an anode brush and a cathode brush which contact and slide against each of the segments when the commutator rotates, wherein a substantial angular width WB of each of the anode brush and the cathode brush satisfies (n−1)(WS+WU)+WU<WB<n(WS+WU)+WU, where n is an integer no less than two,
wherein the coils are each connected to corresponding one of the segments to form n closed loops, wherein each of the n closed loops passes through the corresponding segments and the short-circuit conductor and are electrically independent of each other,
wherein coils which respectively correspond to different closed loops are each cyclically connected to segments which are adjacent to each other in the circumferential direction, and
wherein each of the anode brush and the cathode brush is adapted to contact always with all closed loops.

2. The direct current motor according to claim 1, wherein each of the anode brush and the cathode brush has a low resistance portion and a high resistance portion of which the resistance is higher than that of the low resistance portion, wherein the low resistance portion and the high resistance portion are arranged in such a manner that the high resistance portion is later than the low resistance portion in separating from each of the segments when the commutator rotates.

3. The direct current motor according to claim 2, wherein the low resistance portion is formed integrally with the high resistance portion in each of the anode brush and the cathode brush.

4. The direct current motor according to claim 3, wherein the angular width $WBa$ of the low resistance portion satisfies $(n-1)(WS+WU)+WU<WBa$.

5. The direct current motor according to claim 1, wherein at least either the anode brush or the cathode brush includes a plurality of brushes of the same pole so that the brushes of the same pole respectively contact segments that are short-circuited to each, other by the short-circuit conductor.

6. The direct current motor according to claim 5, wherein the brushes of the same pole include wide brush and narrow brush,
wherein the angular width $WBb$ of the wide brush satisfies $(n-1)(WS+WU)+WU<WBb<n(WS+WU)+WU$, where n is an integer no less than two, and
wherein the angular width $WBc$ of the narrow brush satisfies $WBc<(n-1)(WS+WU)+WU$, and the wide brush and the narrow brush are arranged in such a manner that the circumferential center of the narrow brush is at a distance from the circumferential center of the wide brush by a short-circuit pitch of the short-circuit conductor.

7. The direct current motor according to claim 6, wherein the wide brush has an end portion facing the commutator, and the end portion in an initial state is arcuate and has a radius smaller than the radius of the commutator or are V-shaped and can contact the commutator on both sides in the circumferential direction.

8. The direct current motor according to claim 6, wherein N=2, and
wherein the narrow brush has an end portion facing the commutator, and the end portion in an initial state is arcuate and has a radius greater than the radius of the commutator, or tabular and can contact the commutator at the circumferential center.

9. The direct current motor according to claim 5, wherein the short-circuit conductor short-circuits segments at a short-circuit pitch so that the short-circuited segments become of the same potential,
wherein the brushes of the same pole have a first brush and a second brush which are at a distance from each other, and the first brush and the second brush are arranged in such a manner that the circumferential center of the second brush is located at a point displaced from the location which is at the short-circuit pitch from the circumferential center of the first brush, and
wherein the amount of the displacement is set such that a substantial angular width $WB$ formed by the first brush and the second brush satisfies $(n-1)(WS+WU)+WU<WB<n(WS+WU)+WU$.

10. The direct current motor according to claim 9, wherein the first brush and the second brush have circumferential ends which face each other,
wherein the interval between the circumferential ends is set at the short-circuit pitch so that the first brush substantially continues with the second brush in the circumferential direction, and
wherein the angular width $WBd$ of each of the first brush and the second brush satisfies $nWS/2<WBd<(n(WS+WU)+WU)/2$.

11. The direct current motor according to claim 9, wherein the first brush and the second brush have circumferential ends which face each other, and
wherein the interval between the circumferential ends is set to a value which is equal to the sum of the short-circuit pitch and a value less than the angular width $WS$, so that a substantial circumferential interval between the first brush and the second brush becomes less than the angular width $WS$ of the segments.

12. The direct current motor according to claim 9, wherein the first brush and the second brush have circumferential ends which face each other,
wherein the interval between the circumferential ends is set to be greater than the short-circuit pitch,
wherein the brushes of the same pole further includes a middle brush, and the middle brush is placed substantially between the first brush and the second brush, and
wherein the circumferential center of the middle brush is located at a point displaced from the location which is at the short-circuit pitch from the circumferential center of the first brush, and the circumferential center of the middle brush is located at a point displaced from the location which is at the short-circuit pitch from the circumferential center of the second brush.

13. The direct current motor according to claim 5, wherein the brushes of the same pole include a leading brush and a trailing brush, which is substantially later than the leading brush in separating from each of the segments, and the entirety of the trailing brush has a resistance higher than that of the leading brush, or the brushes of the same pole have a high resistance portion which is substantially the last from among the brushes of the same pole in separating from each of the segments.

14. The direct current motor according to claim 1, wherein the number of the magnetic poles is six,
wherein the number of the teeth is eight,
wherein the number of the segments is twenty-four,
wherein the short-circuit conductor short-circuits segments, skipping seven segments in the circumferential direction,
wherein the number n of the closed loops is 2,
wherein the coils are respectively wound around the teeth, and both ends of each coil are connected to a pair of the segments between which another segment exists, and
wherein the coils include a first coil and a second coil which are adjacent to each other, wherein the second coil is located in a circumferential first direction of the first coil, the second circumferential end of the second coil is connected to a first segment, a second segment is located next to the first segment in a second circumferential direction, and a first circumferential end of the first coil is connected to the second segment.

15. The direct current motor according to claim 1, wherein the number of the magnetic poles is six,
wherein the number of the teeth is eight, wherein the number of the segments is twenty-four,
wherein the short-circuit conductor short-circuits segments, skipping seven segments in the circumferential direction,
wherein the number n of the closed loops is two,
wherein the coils are respectively wound around the teeth, and both ends of each coil are connected to a pair of the segments between which five segments exist, and
wherein the coils include a first coil and a second coil which are adjacent to each other, wherein the second coil is located in a circumferential first direction of the first coil, both ends of the second coil are connected to a first segment and a second segment, wherein a third segment that skips two segments from both of the first segment and the second segment in the circumferential direction, is provided, and wherein the first circumferential end of the first coil is connected to the third segment.

* * * * *